(12) United States Patent
Drake et al.

(10) Patent No.: US 10,414,223 B2
(45) Date of Patent: Sep. 17, 2019

(54) LARGE POWERED JACK

(71) Applicant: Cequent Performance Products, Inc., Plymouth, MI (US)

(72) Inventors: Frank Drake, Wausau, WI (US); Erik Alanko, Wausau, WI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 14/928,291

(22) Filed: Oct. 30, 2015

(65) Prior Publication Data
US 2016/0229244 A1 Aug. 11, 2016

Related U.S. Application Data

(60) Provisional application No. 62/114,923, filed on Feb. 11, 2015.

(51) Int. Cl.
*B60D 1/66* (2006.01)
*B66F 3/08* (2006.01)
*B60S 9/08* (2006.01)

(52) U.S. Cl.
CPC .......... *B60D 1/66* (2013.01); *B60S 9/08* (2013.01); *B66F 3/08* (2013.01)

(58) Field of Classification Search
CPC .......... B60S 9/08; B66F 3/08; B60D 1/66
USPC ................................................ 254/425
See application file for complete search history.

(56) References Cited

U.S. PATENT DOCUMENTS

| | | | | |
|---|---|---|---|---|
| 3,178,958 A | * | 4/1965 | Beck | B66F 3/18 100/289 |
| 3,304,794 A | * | 2/1967 | Bird | B66F 3/08 74/409 |
| 3,911,980 A | * | 10/1975 | McColl | A01G 23/08 144/24.13 |
| 4,067,543 A | * | 1/1978 | Orth | B60S 9/08 254/425 |
| 4,635,904 A | * | 1/1987 | Whittingham | B60S 9/08 192/56.62 |

(Continued)

OTHER PUBLICATIONS

Equalizer Systems, Equalizer Systems Hydraulic Jack Options, 4 pgs., http://equalizersystems.com/equalizer-systems-hydraulic-jack-options/.

(Continued)

*Primary Examiner* — Marc Carlson
(74) *Attorney, Agent, or Firm* — McDonald Hopkins LLC

(57) ABSTRACT

Provided is a jack assembly that may include a first tube having a bearing and a second tube being telescopingly engaged with the first tube. The second tube may be attached to a nut therein. A motor assembly may be attached to the first tube. An elongated screw may be in rotatable communication with the motor assembly, the bearing, and the nut wherein operation of the motor assembly rotates the elongated screw such that the nut telescopingly translates along the elongated screw and the second tube translates relative to the first tube. The nut may be a recirculating ball nut assembly having a housing with at least one track and a plurality of ball bearings. The threads and the track may be configured to receive the plurality of ball bearings therein such that as the elongated screw rotates, the housing of the recirculating ball screw translates along the elongated screw.

24 Claims, 20 Drawing Sheets

(56) References Cited

U.S. PATENT DOCUMENTS

| | | | | |
|---|---|---|---|---|
| 4,949,585 A * | 8/1990 | Dauvegne | B60N 2/0224 | 254/102 |
| 4,969,631 A * | 11/1990 | Whittingham | B60S 9/08 | 254/425 |
| 4,971,292 A * | 11/1990 | Craig | B66F 3/08 | 254/7 R |
| 6,224,103 B1 * | 5/2001 | Hatcher | B60S 9/08 | 254/419 |
| 6,494,005 B2 * | 12/2002 | Zimmerman | B66F 3/10 | 108/147 |
| 7,621,356 B2 * | 11/2009 | Quarberg | B60D 1/246 | 180/11 |
| 8,523,148 B2 * | 9/2013 | Beck | B60D 1/66 | 254/100 |
| 8,910,924 B2 * | 12/2014 | Alanko | B60S 9/08 | 254/418 |
| 8,944,467 B1 * | 2/2015 | Dill | B60S 9/08 | 280/766.1 |
| D727,213 S * | 4/2015 | Anderson | D12/106 | |
| 2005/0073130 A1 * | 4/2005 | McGlothlin | B60S 9/08 | 280/475 |
| 2006/0113453 A1 * | 6/2006 | Bakshi | B60S 9/08 | 248/405 |
| 2007/0051933 A1 * | 3/2007 | Rincoe | B60S 9/08 | 254/425 |
| 2008/0146397 A1 * | 6/2008 | Drake | B60S 9/08 | 475/206 |
| 2008/0217898 A1 * | 9/2008 | Hanscom | B60S 9/06 | 280/763.1 |
| 2012/0091411 A1 * | 4/2012 | Hansen | B60D 1/66 | 254/93 R |
| 2015/0137498 A1 * | 5/2015 | Klassy | B60S 9/02 | 280/763.1 |
| 2015/0224838 A1 * | 8/2015 | Laarman | B60S 9/08 | 280/766.1 |
| 2016/0023641 A1 * | 1/2016 | Klassy | B60S 9/08 | 280/766.1 |
| 2016/0145084 A1 * | 5/2016 | Huang | B66F 3/44 | 254/103 |

OTHER PUBLICATIONS

Bulldog, HD Square Jacks—12,000lbs., 2 pgs., http://www.bulldogproducts.net/products/trailer-jacks/hd-square-jacks/hd-square-jacks-12-000-lbs-/.

Nuera Trailerparts, 10K Atwood Duraleg Power Jack, 2 pgs., https://www.nueratrailerparts.com/10k-atwood-duraleg-power-jack.html.

\* cited by examiner

LARGE POWERED JACK

CROSS-REFERENCE TO RELATED APPLICATIONS

This application claims priority to U.S. provisional patent application No. 62/114,923 filed on Feb. 11, 2015 titled LARGE POWERED JACK which is incorporated by reference in its entirety.

FIELD OF THE INVENTION

The present invention relates generally to electrically powered jacks for vehicles, and more particularly, to high powered jacks for vehicles.

BACKGROUND

Jacks and jack assemblies have long been used with towed vehicles. Typically, a jack assembly is secured to a towed trailer such as a straight tongue or an A-frame type trailer and assists in stabilizing the towed trailer while the trailer is detached from a towing vehicle. In addition, a jack assembly often assists in engaging a towed vehicle with a towing vehicle or disengaging a towing trailer from a towing vehicle. A jack assembly may be utilized to maintain a towed vehicle in a level position when the towed vehicle is disengaged from a towing vehicle. A jack assembly may also be utilized to change the vertical position or height of the tongue of a trailer as the tongue is mounted onto or dismounted from the hitch of a towing vehicle.

Such jack assemblies are commonly pivotally mounted onto the trailer tongue so as to be pivotally moveable between a vertical position and a horizontal position. The horizontal position often allows the jack assembly to be stowed when the jack assembly is not in use. Most conventional jack assemblies are manually toggled between a raised position and a lowered position by the use of a crank and gear assembly. These jack assemblies utilize rotation that is translated into linear motion to extend or retract a portion of the jack assembly.

Additionally, other jack assemblies are automatically powered by an electric motor device. The rotation of the rotor ultimately rotates a screw that translates a nut thereon. The nut may be attached to a jack leg and extends or retracts the jack leg from the jack body. The direction that the screw is rotated toggles the direction that the jack leg linearly translates relative to the jack body. However, electric powered jack assemblies have power limitations due to the friction caused by the interaction of the rotor, gears, screw, and nut. This friction causes significant heat and energy loss thereby restricting the overall load that is capable of being lifted and supported on the jack assembly.

In some instances, high powered jacks are capable of supporting and translating increased loads at a particular rate of speed. However, these high powered jacks utilize an electrical system that utilizes an electric motor, to operate a hydraulic pump or compressor as well as an assembly that automatically toggles a solenoid valve to pressurize a hydraulic or pneumatic system to cause the jack leg to linearly translate relative to the jack body. These high powered jacks require electrical, hydraulic or pneumatic, and mechanical systems working together to properly operate and support a heavy load, for example, loads in excess of 8,000 lbs. These systems require a plurality of different types of mechanisms, may be costly to manufacture, and, due to an increased number of movable parts, may have a higher risk of failure. Further, the energy conversion from electrical to hydraulic to mechanical may include an unavoidable energy loss that is irreversible. This phenomenon will increase entropy which is evidence of the inefficiencies.

In further instances, high powered jacks configured to translate a heavy load are susceptible to overload protection requirements as well as braking requirements to control the translation of the jack. For example, overload protection may include an over-current protector used as a torque limiting mechanism. During an overload situation, the current increases when the load increases. An over-current protector would allow the power source to be disconnected when over-current occurs, effectively limiting the torque and prevent breakdown of the transmission mechanism.

The jack would also include a brake device to stop translation while maintaining the heavy load in position thereon. However, the prior art high powered jacks have failed to provide both overload protection and brake requirements in a sufficient manner that would support the heavy load functionality of the jack. Due to multiple types of energy conversions, jack designs should provide a brake device to stop translation considering each energy form (electric, pneumatic, hydraulic) beginning at the electric motor and continuing down the power path through each of the multiple iterations of energy conversion to the final method of elevation of the heavy load. Therefore, the brake device must also account for all types of system failures (ie. if a hydraulic or pneumatic tube or valve breaks) in order to maintain the load.

For example, known prior art high powered jacks may incorporate a brake device such as a conventional electromagnetic brake used as a brake mechanism wherein the electromagnetic brake and the overload protection mechanism are installed at different positions of the jack. Such an arrangement increases the cost of manufacturing and further may not be compatible for smooth jack operation. This arrangement may subject the internal mechanisms to an increase risk of cyclic failure over time. Further, these mechanisms require a power supply and, may be particularly suspect during low voltage conditions such as high current startup. Thus, the power jack may be inoperable in situations of low battery or insufficient voltages. Additionally, the overload protection mechanism and brake device may require some buffer time for shutdown and startup which may be undesirable.

Therefore there is a need for a high powered jack assembly that is not subject to significant friction and energy loss. There is also a need for providing a high powered jack assembly that does not rely on hydraulic or pneumatic systems to support a heavy load and lift a load at an increased rate of speed. Additionally, there is a need for overcoming the drawbacks of the prior art.

SUMMARY

A jack assembly for a towed vehicle is shown and described. The jack assembly comprising a first member, a second member telescopingly engaged with the first member. The second member may be engaged with a nut therein. A motor assembly and an elongated screw in rotatable communication with the motor assembly and the nut wherein operation of the motor assembly rotates the elongated screw causing the nut to translate along the elongated screw and causing the second member to translate relative to the first member such that the first and second member may support loads in excess of 8,000 pounds at a rate of speed that exceeds about 10 inches per minute. The motor assembly may include a rotor configured to rotate about a first axis within a housing wherein the elongated screw may be configured to rotate about a second axis within the first and second members. An attachment assembly may be connected to the first member that is configured to attach the jack assembly to a vehicle and a base member may be attached to the second member opposite from the motor assembly. The first member may include an outer tube and the second member may include an inner tube.

In one embodiment, the nut may be a recirculating ball screw assembly having a housing with at least one track and a plurality of ball bearings. The elongated screw may include a plurality of threads wherein the threads and the track are adapted to receive the plurality of ball bearings therein such that as the elongated screw rotates, the plurality of ball bearings move through the threads and track as the housing of the recirculating ball screw translates along the elongated screw.

In another embodiment, provided is a jack assembly for a vehicle, the jack assembly may include a first tube and a second tube that may be telescopingly engaged with said first tube. A telescoping mechanism may be operatively coupled with said first and second tubes, wherein said telescoping mechanism telescopingly positions said first tube relative to said second tube. The telescoping mechanism may include a single elongated screw and a recirculating ball screw assembly. The recirculating ball screw assembly may be configured to translate along the elongated screw such that the first tube and second tube may be electronically controlled to telescope relative to one another between a retracted position and an extended portion.

In another embodiment, provided is a single energy conversion high powered jack assembly for a towed vehicle, the jack assembly may include a first member and a second member operatively engaged with said first member. A telescoping mechanism may be operatively coupled with said first and second member, wherein said telescoping mechanism telescopingly positions said first member relative to said second member. The telescoping mechanism may include at least one elongated screw and a recirculating ball nut assembly configured to translate along the elongated screw such that the first member and second member are configured to be electronically controlled to telescope relative to one another between a retracted position and an extended portion.

The jack assembly may include components that produce a torque limitation effect and components that produce a braking effect. These components may be within the housing or gearbox of the jack assembly and may achieve effects of torque limitation and braking simultaneously.

BRIEF DESCRIPTION OF THE DRAWINGS

The present teachings may be better understood by reference to the following detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
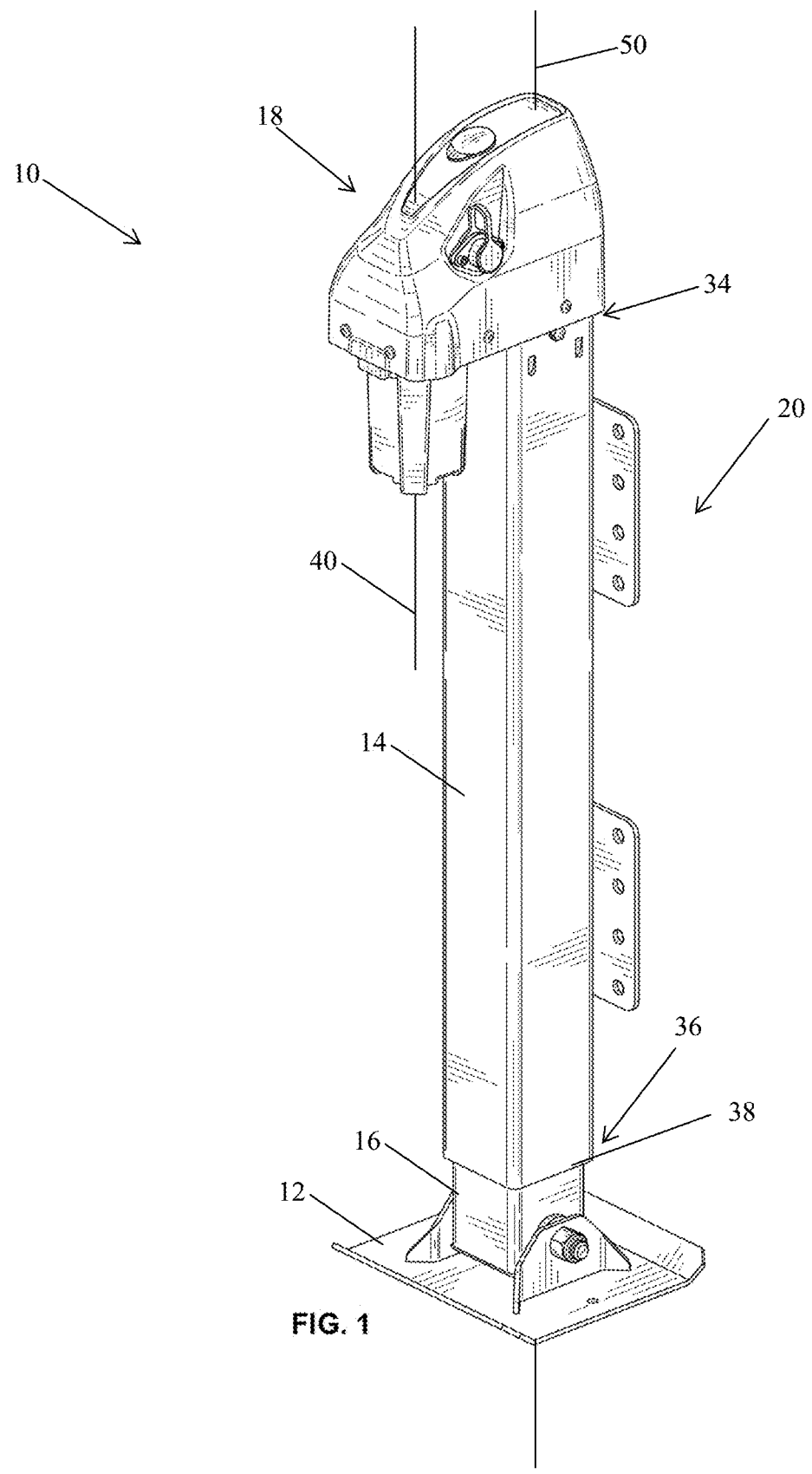
FIG. 1 is a perspective view of an embodiment of a jack assembly in a retracted position.
Figure 2:
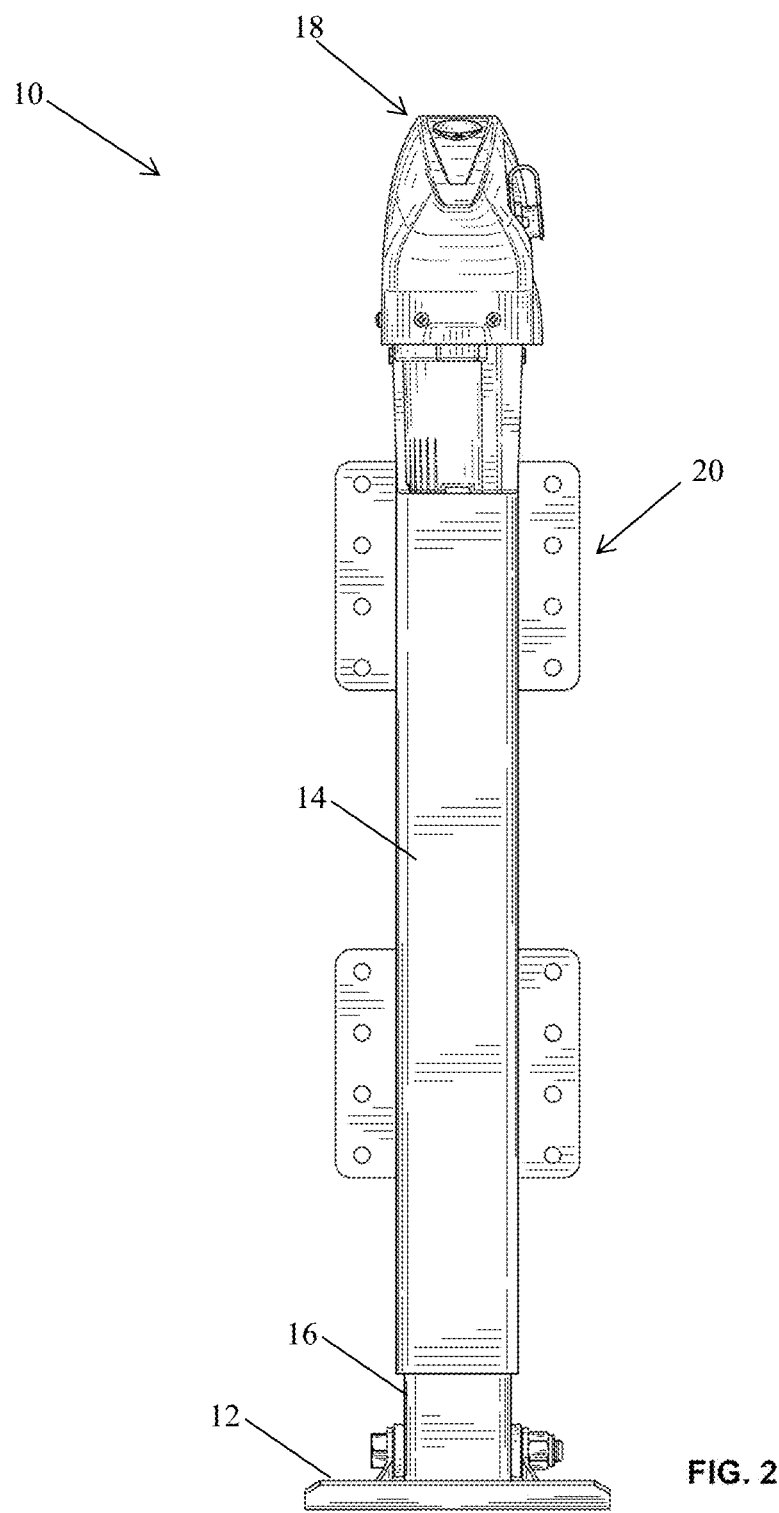
FIG. 2 is a front view of the jack assembly.
Figure 3:
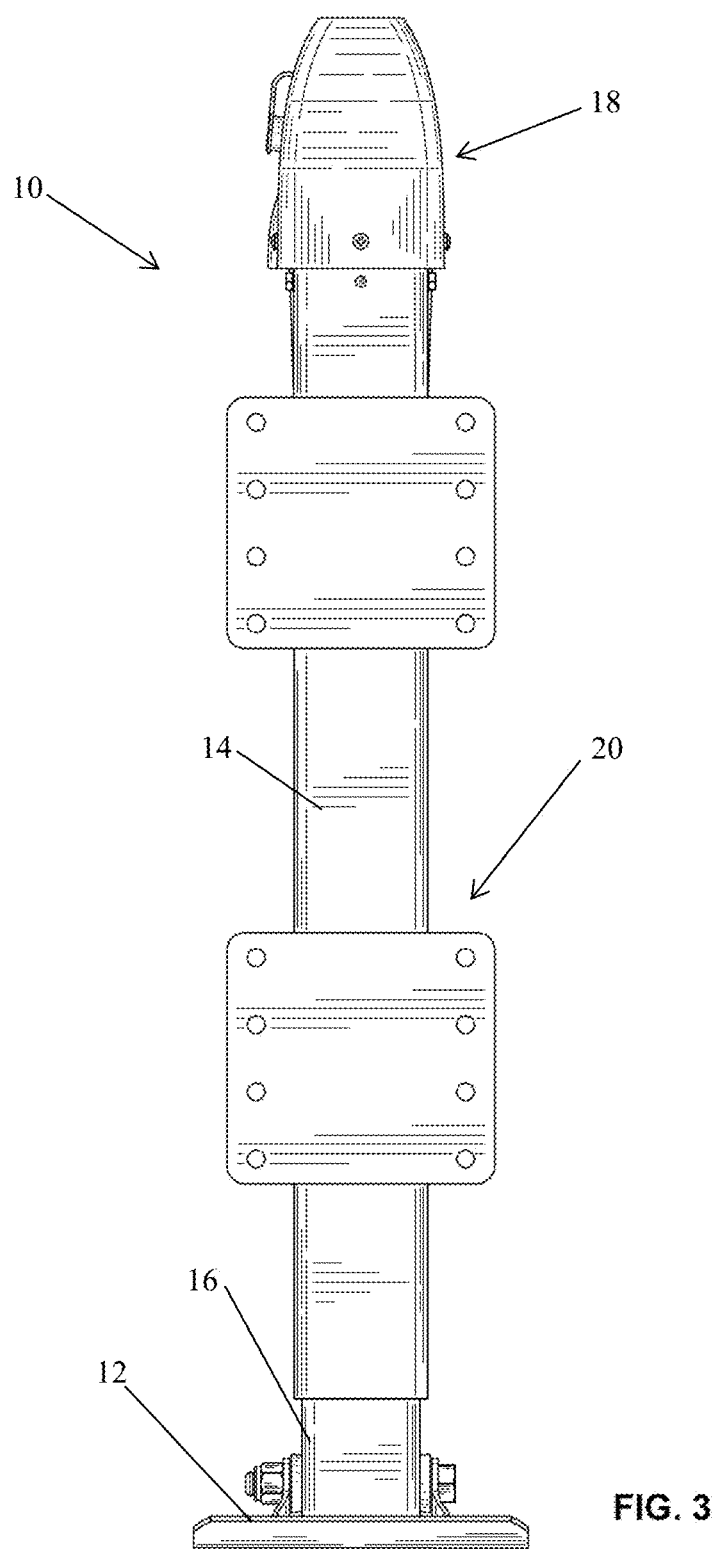
FIG. 3 is a rear view of the jack assembly.
Figure 4:
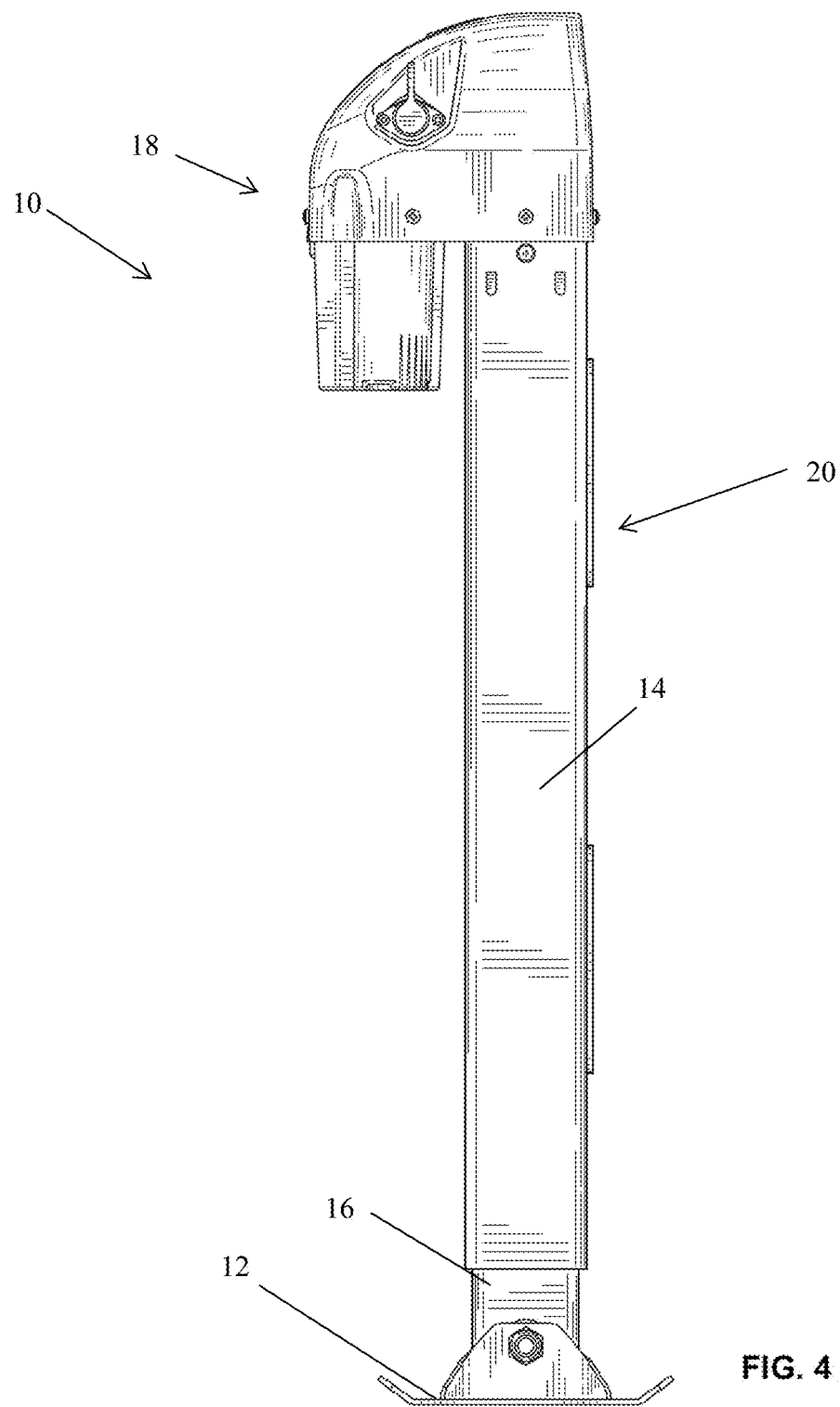
FIG. 4 is a first side view of the jack assembly.
Figure 5:
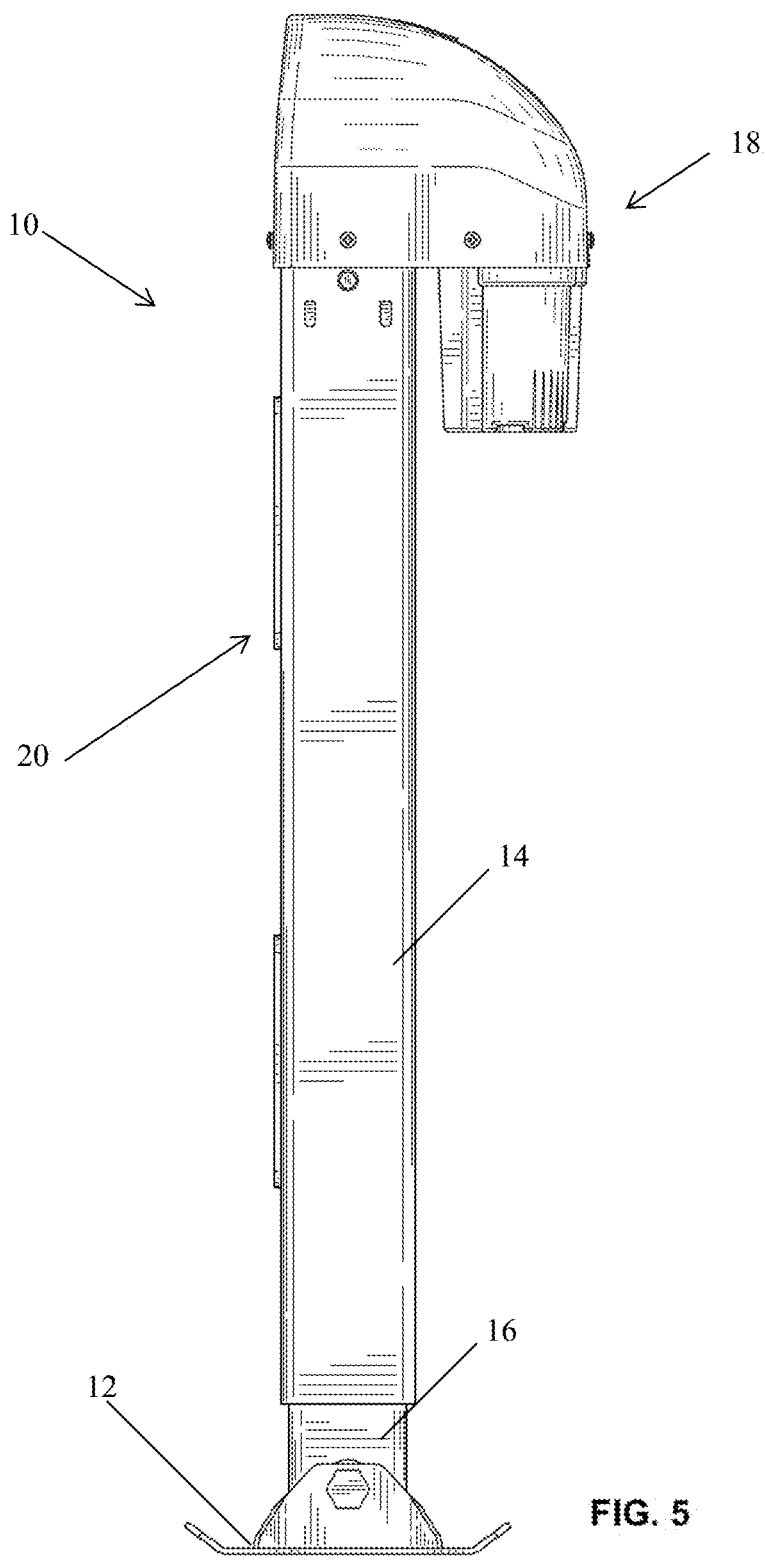
FIG. 5 is a second side view of the jack assembly.
Figure 6:
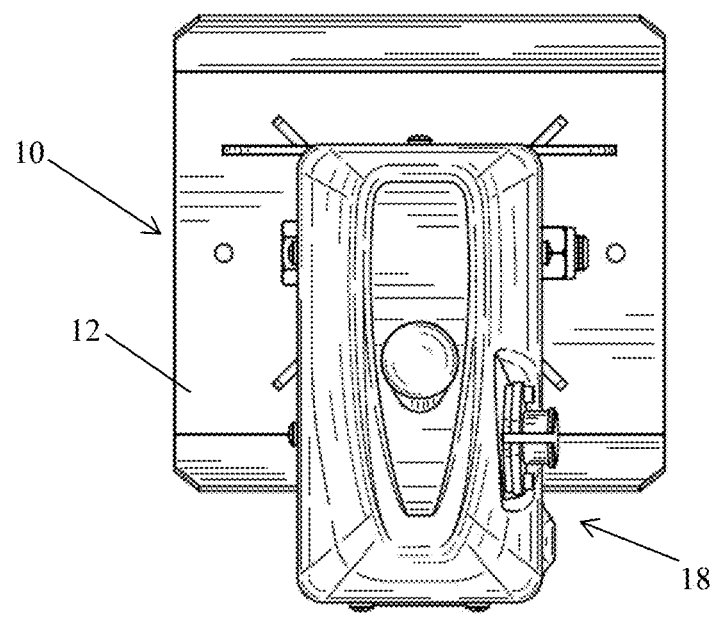
FIG. 6 is a top view of the jack assembly.
Figure 7:
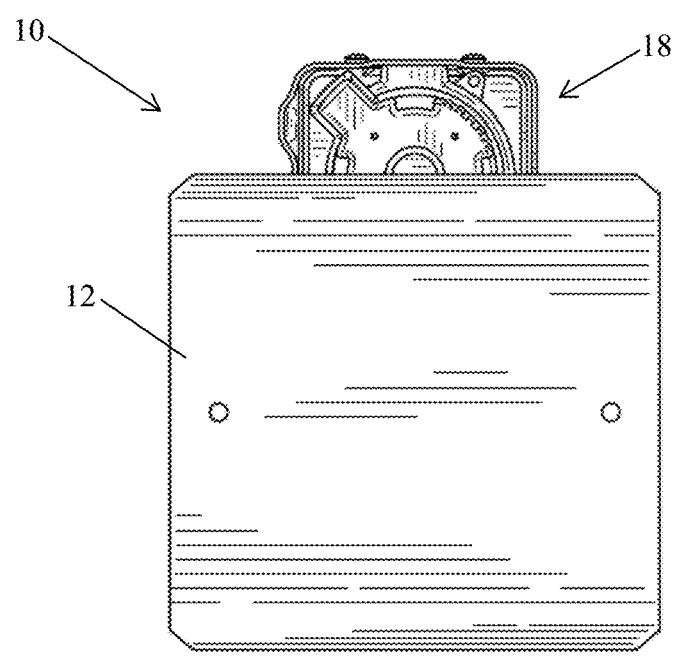
FIG. 7 is a bottom view of the jack assembly.
Figure 8:
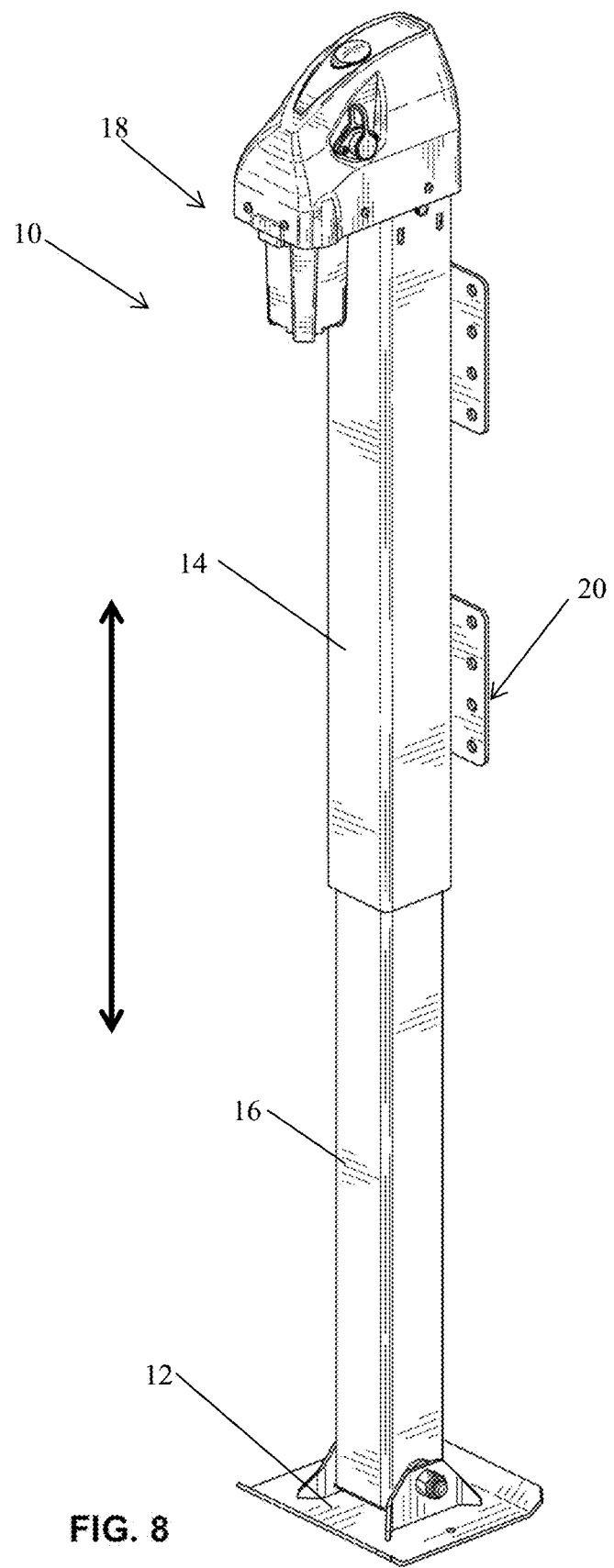
FIG. 8 is a perspective view of the jack assembly in an extended position.

FIGS. 1 through 10 illustrate high powered jack assemblies that include a number of novel improvements over other powered jack assemblies currently known in the art. Notably, the high powered jack assembly is considered "high powered" for the purposes of this application as the jack is capable of supporting and translating a heavy load, (generally over 8,000 lb.) at a high rate of speed (generally over 10 inches per minute). Alternatively, the jack assembly may be considered "high powered" for the purposes of this application as the jack assembly is capable of supporting and translating a heavy load due to a high input power with a high amount of efficiency. In particular, a high input power may be about 0.9 horsepower or about 670 watts while a high amount of efficiency may be about 40% at ambient conditions between 0 degrees F. and 120 degrees F. For example, FIG. 1 illustrates a perspective view of an exemplary embodiment of a jack assembly 10. The jack assembly 10 includes a base 12, an outer tube 14, an inner tube 16, a motor assembly 18, and an attachment assembly 20. Notably, the base 12 may optionally be a wheel assembly/caster assembly (not shown) to allow for movement of the jack assembly 10. Additionally, the attachment assembly 20 may optionally be a pivot assembly (not shown) configured to rotate the jack assembly between a horizontal and vertical position. In one embodiment, the base 12 may be a self leveling foot configured to adjust its support position relative to an axis of translation 50 of the jack assembly 10 and a surface such as the ground. The base 12 may self level by biasing relative to the axis 50 as the jack assembly 10 is operated.

FIGS. 1-7 illustrate the jack assembly 10 in a retracted position. The jack assembly 10 is arranged such that the inner tube 16 is assembled at least partially within the outer tube 14, and the outer tube 14 is capable of telescopic movement along the inner tube 16. Generally, telescopic movement of the outer tube 14 relative to the inner tube 16 allows for adjustment of the height of the jack assembly 10. Typically, a user of the jack assembly 10 may want to alter the height of the jack assembly 10 to support a detached trailer in a level position. A user may also want to adjust the height of the jack assembly 10 to facilitate mounting and dismounting of a trailer to a towing vehicle.

Figure 9:
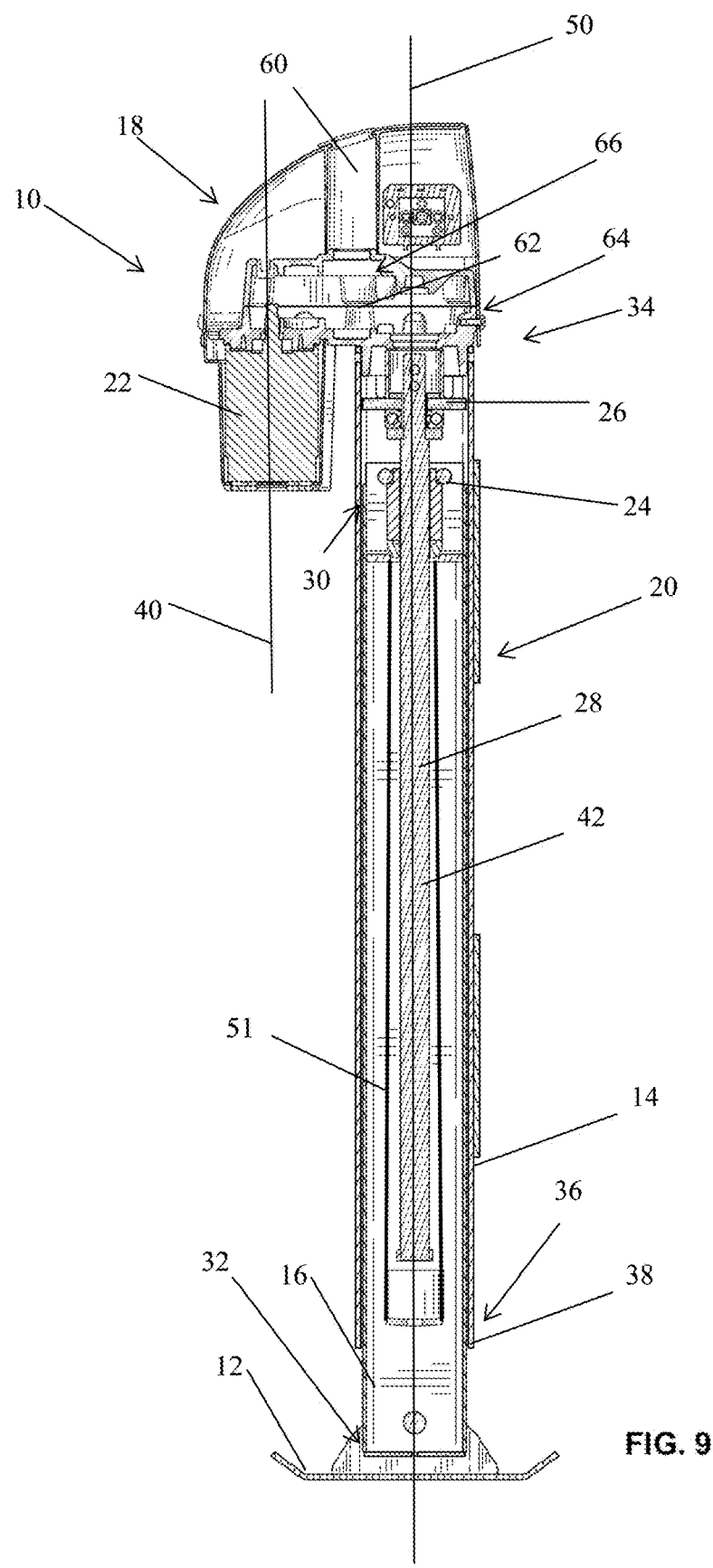
FIG. 9 is a cross sectional view of the jack assembly.
Figure 10:
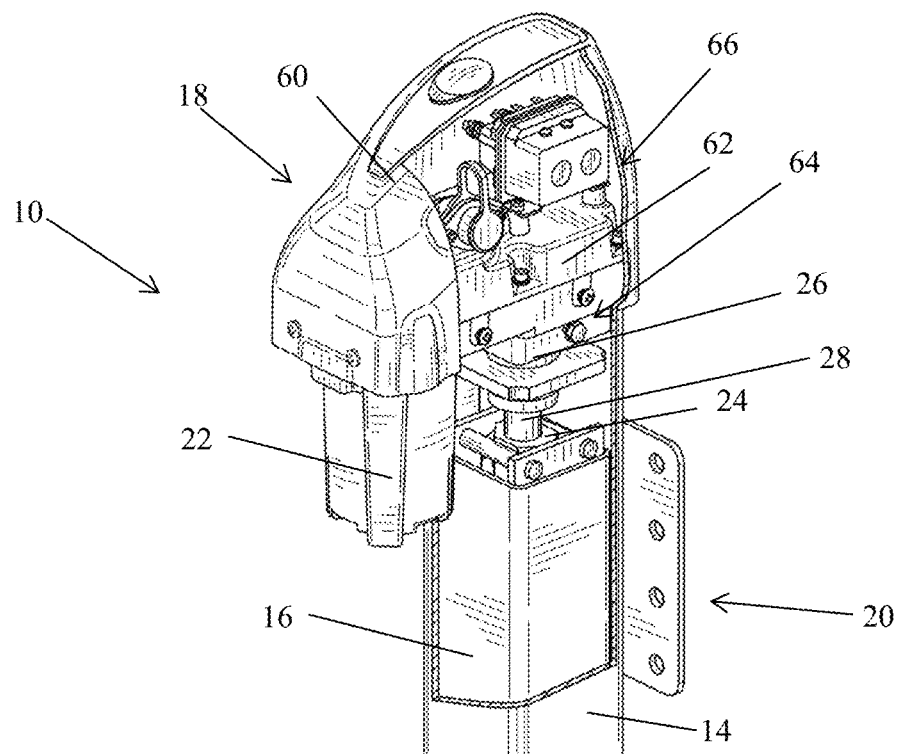
FIG. 10 is a perspective view with a partial cutout of the jack assembly.

The jack assembly 10 may be arranged such that the height of the jack assembly 10 may be increased or decreased automatically by the operation of the motor assembly 18. As illustrated by FIG. 9, the motor assembly 18 may include a power source such as a motor 22 that is configured to rotate along a first axis 40. Additionally, a nut 24 may be coupled to the inner tube 16. In one embodiment, the nut 24 may be attached to an upper portion 30 of the inner tube 16 and the base 12 may be attached to an opposite lower portion 32 of the inner tube 16. A bushing 26 may be coupled to the outer tube 14. The bearing 26 may be coupled to an upper portion 34 of the outer tube 14 opposite from an opening 38 defined by a lower portion 36 of the outer tube 14. The inner tube 16 may be positioned within the opening 38 of the outer tube 14.

The nut 24 and bushing 26 may be housed within the outer tube 14. An elongated screw 28 may extend along a second axis 50 within at least a portion of the inner tube 16 and the outer tube 14. The elongated screw 28 may include a plurality of threads 42 that rotationally interact with the nut 24 and the bushing 26. The motor assembly 18 may be arranged such that the rotation of a motor 22 about the first axis 40 may cause the elongated screw 28 to rotate about the second axis 50. The rotation of the screw 28 may cause the nut 24 to translate along the length of the screw 28 and telescopically move the inner tube 16 relative to the outer tube 14.

A grease/dust tube 51 may be provided within the outer tube 14 and inner tube 16. The dust tube 51 may be a labyrinth seal and generally surround the elongated screw 28 within the jack assembly 10. The dust tube 51 may be configured to prevent intrusion of dust, dirt, or debris by providing a tortuous path that reduces the exposure of debris against the threads of the screw 28.

The motor assembly 18 may include a housing 60 and the motor 22 and a mechanism such as a gearbox assembly 62 that couples the motor 22 with the elongated screw 28. This configuration allows the motor 22 to impart rotation to the elongated screw 28. The nut 24 may be positioned on the elongated screw 28 and may be in contact with the inner tube 16. As the elongated screw 28 rotates, the nut 24 moves along the screw 28 to facilitate the sliding or moving of the outer tube 14 relative to the inner tube 16. The axial alignment of the tubes 14, 16 my prevent binding or galling of the screw 28 and nut 24. In addition, maintaining axial alignment also limits or prevents galling of the tubes 14, 16 by frictional interaction between said tubes.

Figure 11:
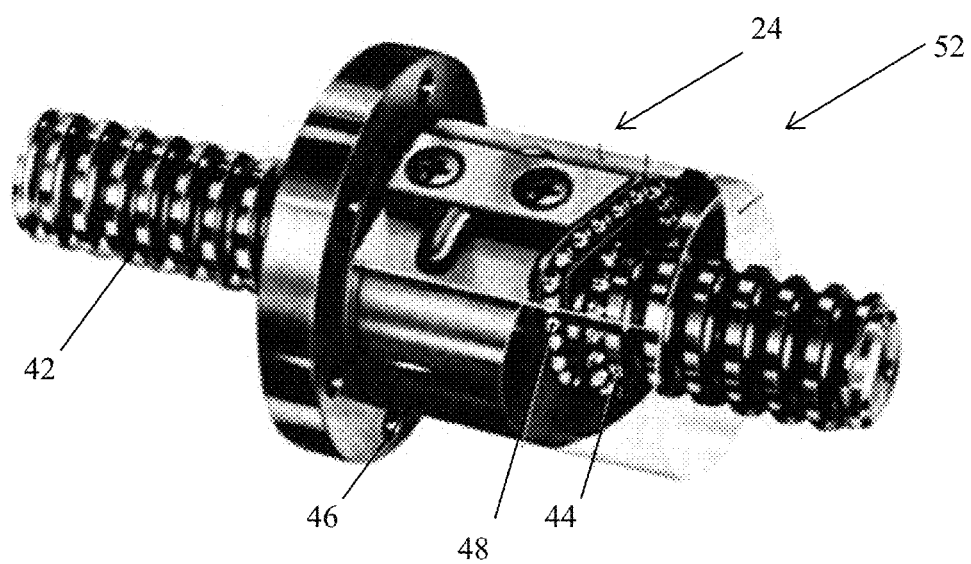
FIG. 11 is a perspective view of a recirculating ball screw of the jack assembly.

In one embodiment, as illustrated by FIG. 11, the nut 24 may be a recirculating ball nut assembly 52. A recirculating ball nut assembly 52 may be arranged to translate along the elongated screw 28 with a plurality of ball bearings 44 aligned within a housing 46 of the recirculating ball nut assembly 52. The ball bearings 44 may be configured to ride and roll between the screw 28 and a track. 48 defined within the housing 46 of the nut 24. The thread profile 42 of the elongated screw 28 may include a generally rounded shape to conform to the spherical shape of the recirculating ball bearings 44 of the recirculating ball nut assembly 52. Additionally, the track 48 may include a generally rounded shape to conform to the spherical shape of the recirculating ball bearings 44.

Figure 17:
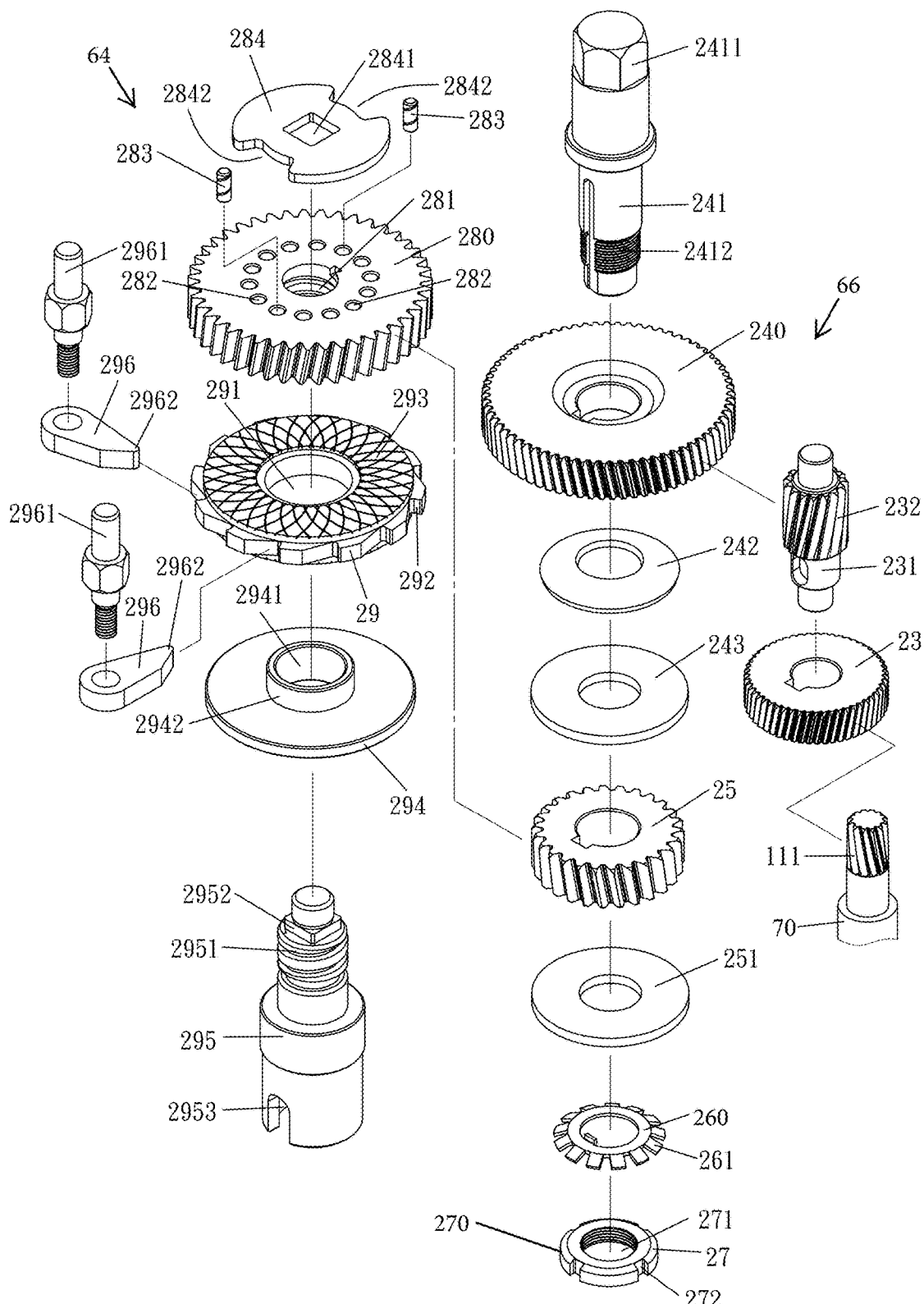
FIG. 17 is an exploded top view of a transmission structure of elements of the motor assembly of the large powered jack of the present invention.

Additionally, in one embodiment, a brake mechanism 64 may be configured to engage the elongated screw 28 to the gearbox mechanism 62 and prevent rotation when the motor 22 is not in operation. The brake mechanism 64 may be located within the housing 60 and be configured to engage the gearbox mechanism 62 automatically when the motor 22 is not actuated. The brake mechanism 64 may prevent gear train rotation and in turn ball screw rotation and thus prevent vertical translation of the nut 24 along the elongated screw 28. Additionally, the gearbox mechanism 62 may include a clutch device 66 that prevents damage to the assembly if a user attempts to actuate the motor 22 beyond a threshold. The clutch device 66 may be configured to engage or disengage power from the motor 22 to the screw 28. This orientation would ensure a consistent and safely working operation. In one embodiment, the brake mechanism 64 may be internal to the gearbox mechanism 62 and may include elements 284 through 295 as illustrated by FIG. 17. In one embodiment, the clutch 66 may be internal to the gearbox mechanism 62 and may include elements 241 through 272 as illustrated by FIG. 17.

An advantage of the use of a recirculating ball nut assembly 52 over threaded screws is it may produce a higher transmission efficiency resulting in less screw heating which may impact the repeatability and accuracy of the translation of the nut 24 relative to the screw 28. Also, a recirculating ball nut assembly 52 may cause reduced amount of friction and therefore allow the nut and screw to rotate relative to one another at increased, speeds. These features may allow the assembly 52 to perform accurately controlled incremental rotations relative to similar threaded screws. Additional advantages of ball screws include a predictable service life and lower wear rate. The recirculating ball nut assembly 52 provides rolling friction which is distinguishable from sliding friction attributable to standard screw and nut assemblies. Notably, in sliding friction applications, the screw to nut interaction may risk having direct metal to metal contact in instances where lubrication is compromised) such that increased work is lost due to increased entropy. The rolling friction application of the recirculating ball screw reduces the losses due to energy losses and associated entropy gain.

The jack assembly utilizes rolling friction to translate the inner tube relative to the outer tube. This configuration avoids having to incorporate a hydraulic or pneumatic system within the jack assembly. This configuration may be capable of supporting, lifting and lowering loads in excess of 8,000 pounds at a rate of speed that may exceed 10 inches per minute which was otherwise not available in the prior art without the use of hydraulic or pneumatic systems that also include an electronic system, i.e. a multiple mechanism system. The speed of the translation of the recirculating ball nut 24 relative to the elongated screw 28 may be increased and comparable to the use with a hydraulic or pneumatic system.

Figure 12:
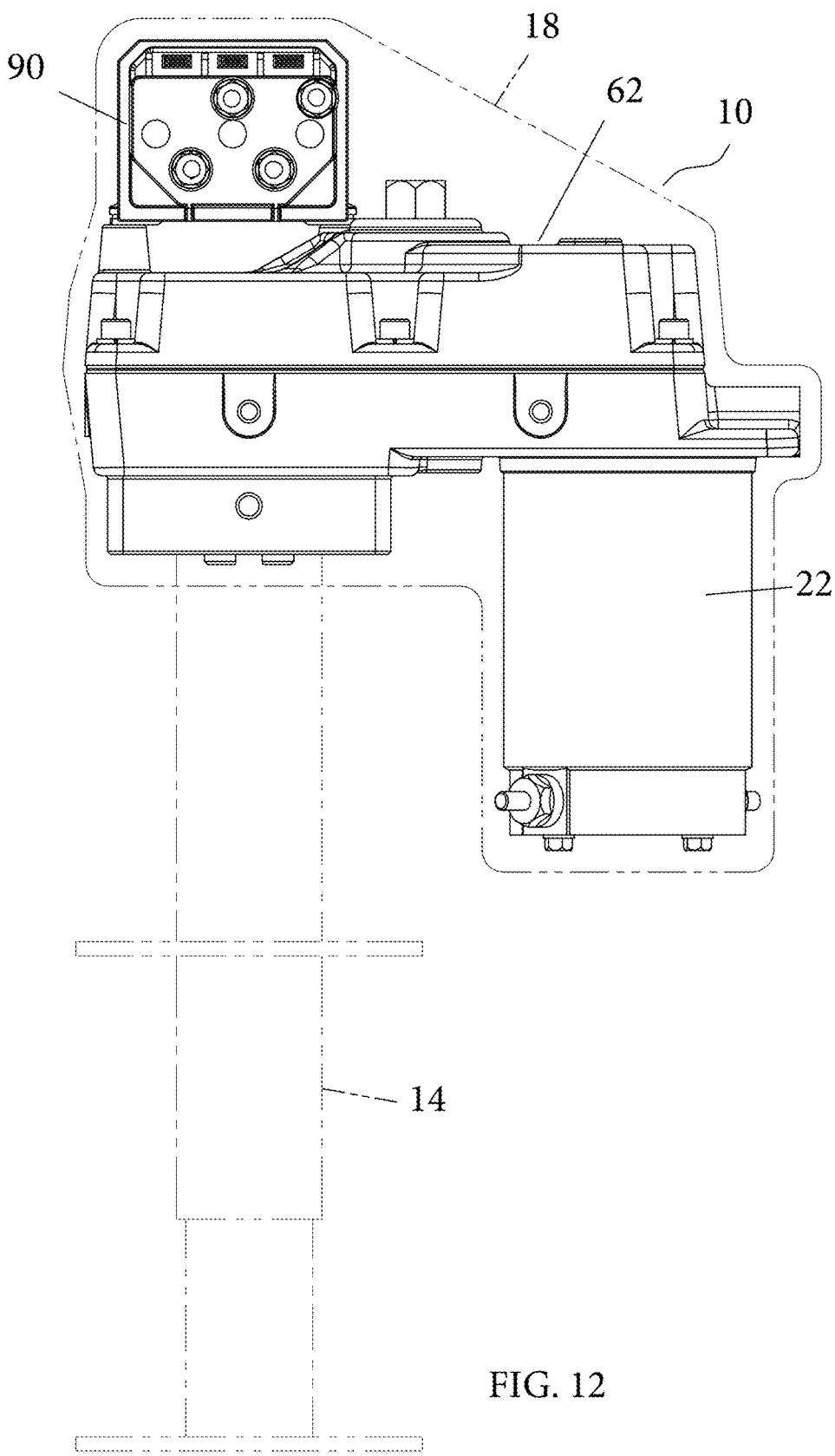
FIG. 12 is a schematic view of a preferred embodiment of the motor assembly in accordance with the present invention.
Figure 13:
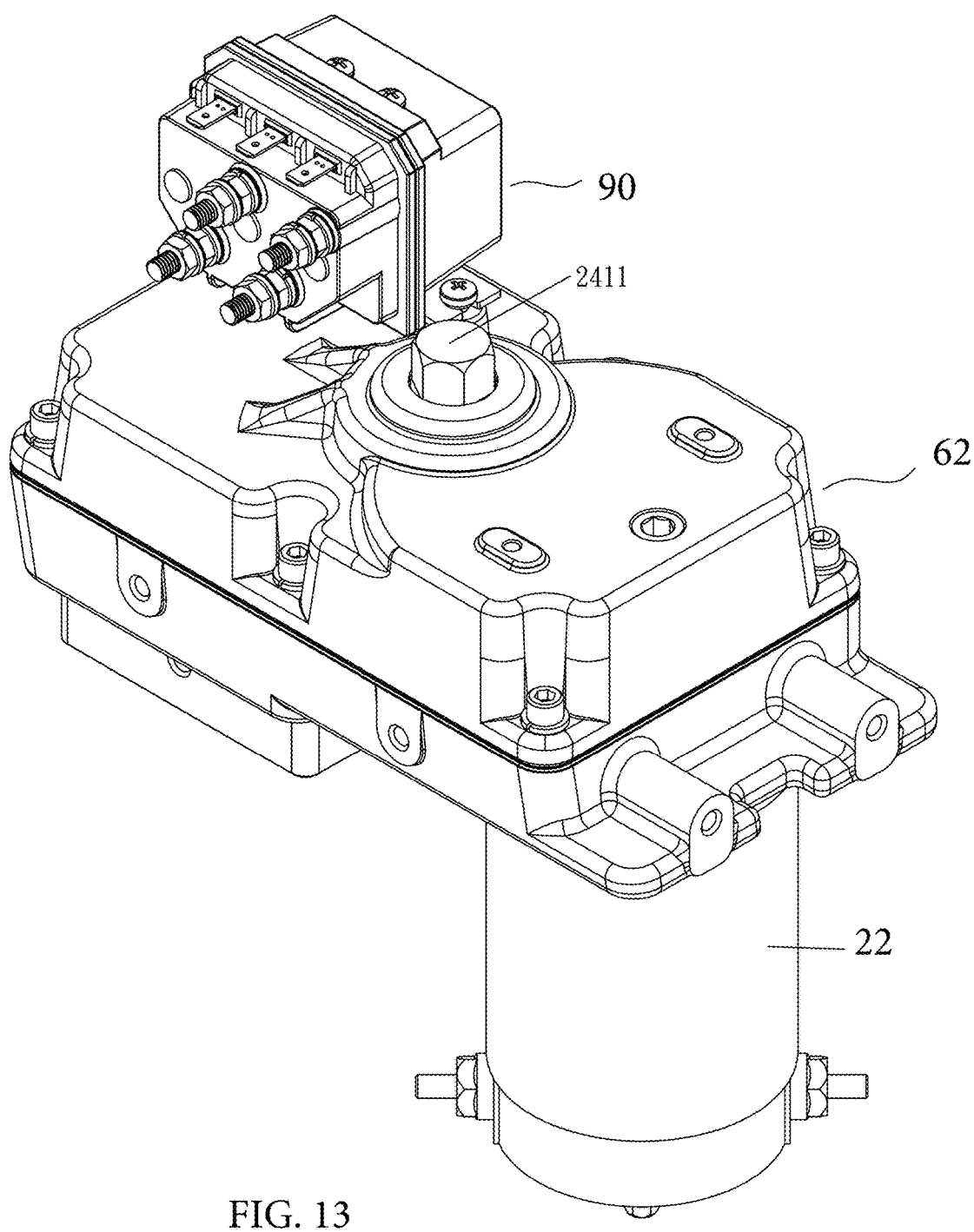
FIG. 13 is a perspective top view of elements of the motor assembly of the large powered jack of the present invention.
Figure 14:
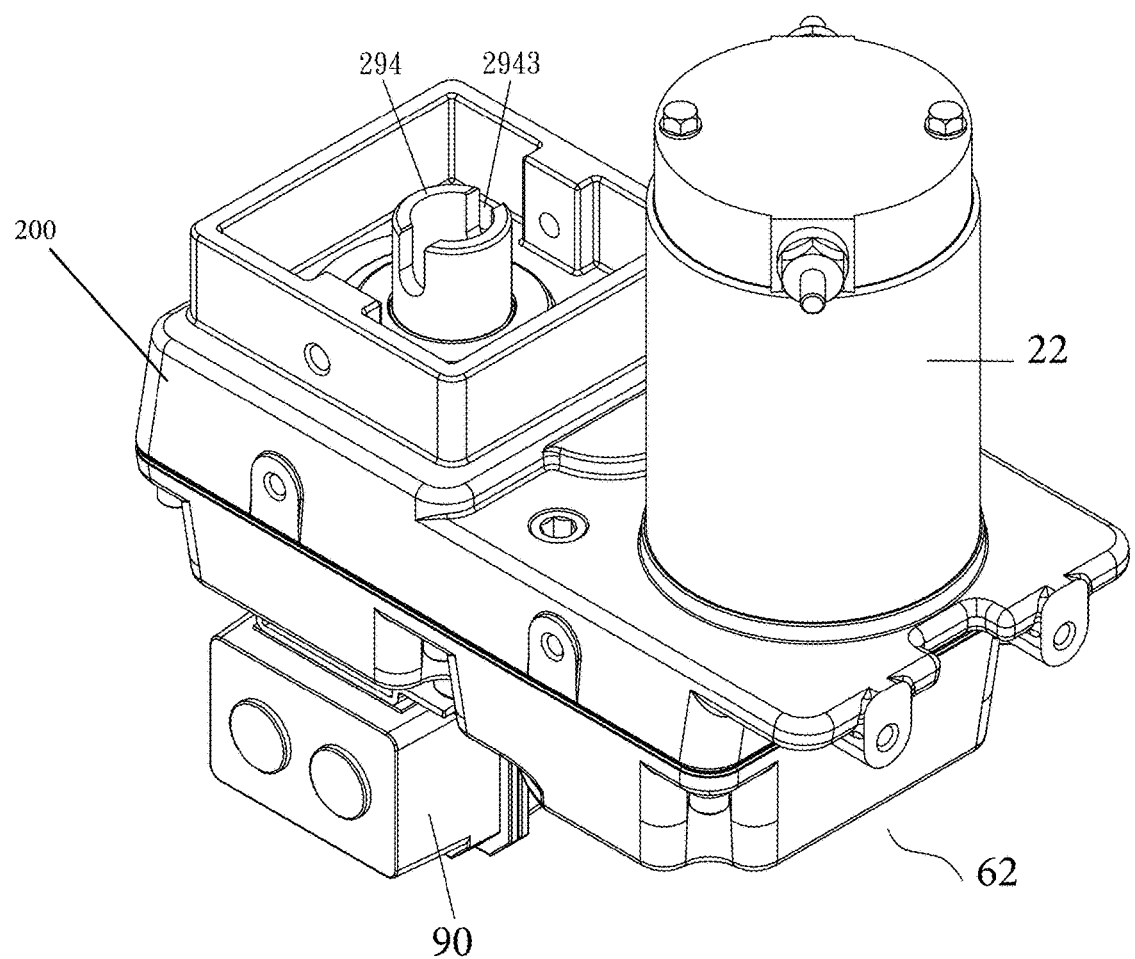
FIG. 14 is a perspective bottom view of elements of the motor assembly of the large powered jack of the present invention.

FIGS. 12-19 illustrate embodiments of the motor assembly 18 and gearbox assembly 62 that couples the motor 22 with the elongated screw 28. With reference to FIG. 12, the jack assembly 10 includes the housing 60, having telescopic tubes 14, 16 extended downwardly from the housing 60. An interior space is covered by the housing 60 for installing the gearbox assembly 62 capable of producing the translating effects. In FIGS. 13 and 14, the housing 60 includes the motor 22 (e.g. a DC motor), a reduction gearbox assembly 62 and a controller 90.

Figure 15:
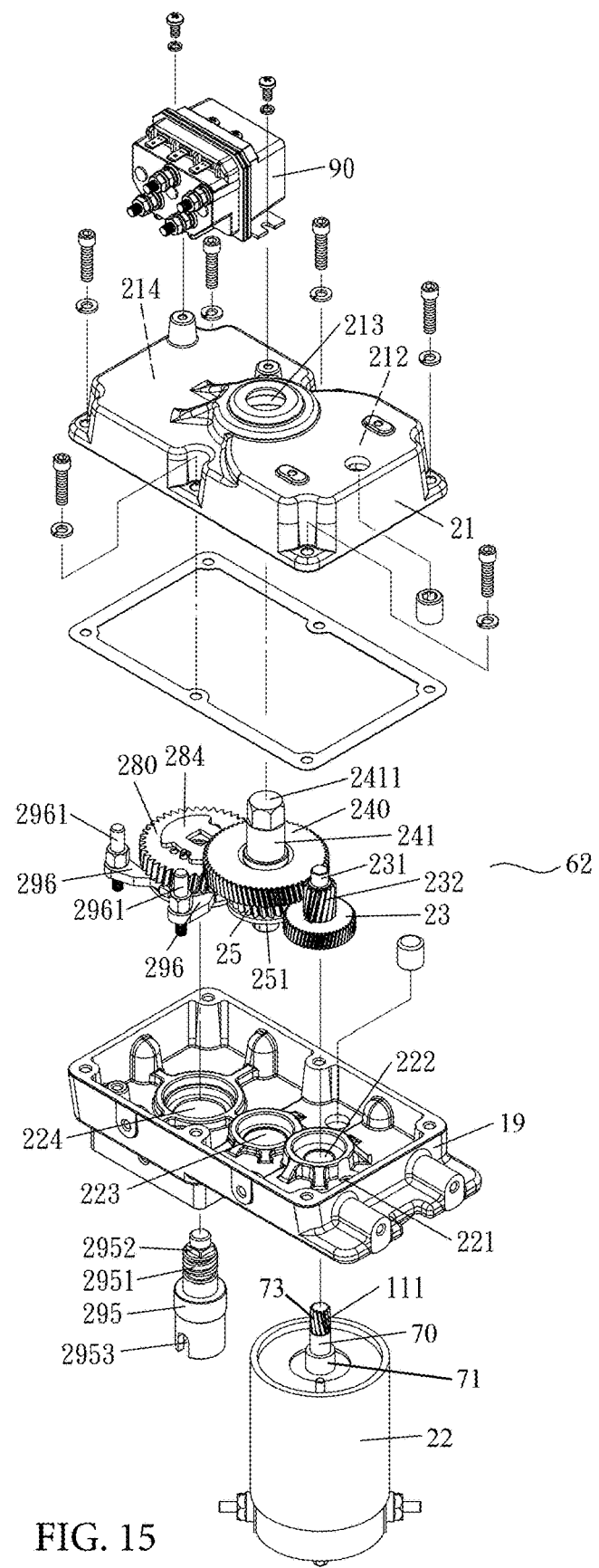
FIG. 15 is an exploded top view of elements of the motor assembly of the large powered jack of the present invention.
Figure 16:
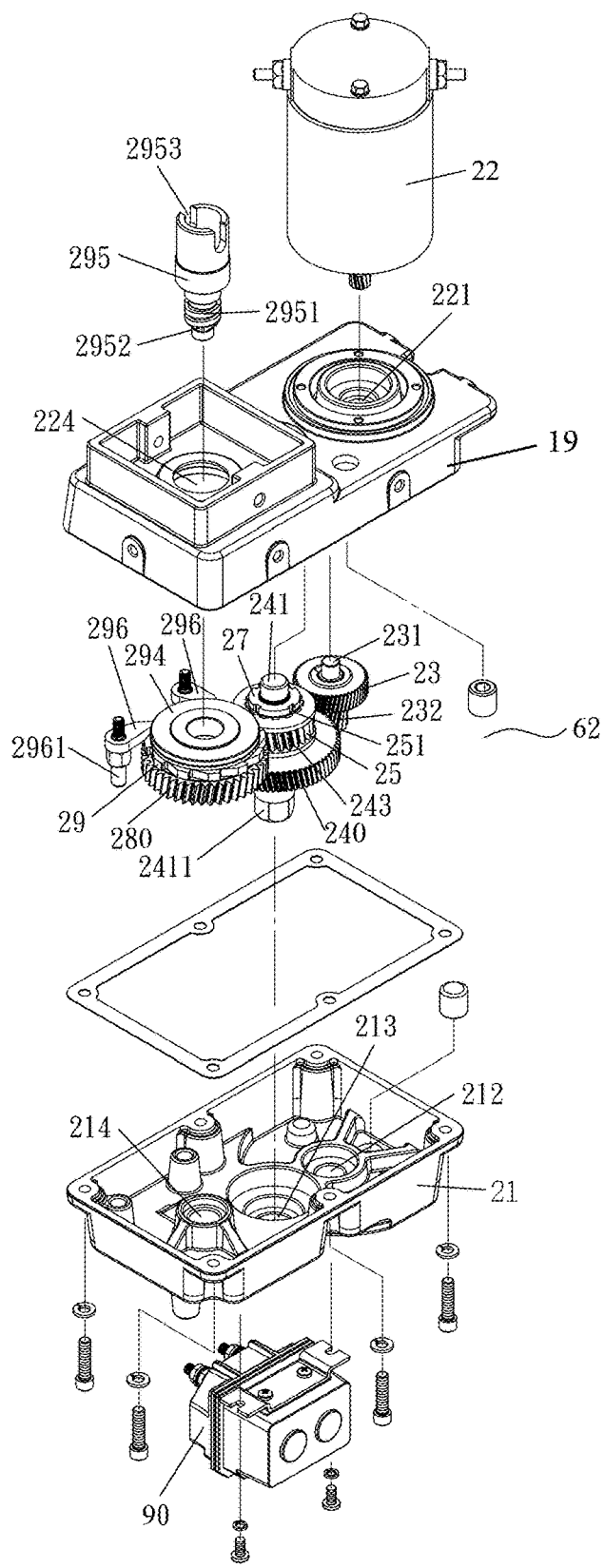
FIG. 16 is an exploded bottom view of elements of the motor assembly of the large powered jack of the present invention.

In FIGS. 15 and 16, the motor 22 includes an output shaft 71 coupled to a power shaft 70, and a first-section pinion 111 disposed on a surface 73 of the power shaft 70. The reduction gearbox assembly 62 includes a chassis 200 formed by engaging an upper chassis 21 and a lower chassis 19, and the interior space of the chassis 200 is provided for installing a gear mechanism (which will be described in more detail below) driven and rotated by the first-section pinion 111 of the power shaft 70. The upper chassis 21 may comprise a first upper positioning cavity 212, an upper middle through hole 213 and a second upper positioning cavity 214, and the lower chassis 19 may comprise a lower force-input perforation 221 (as shown in FIG. 16), a first lower positioning cavity 222, a second lower positioning cavity 223 and a lower force-output perforation 224.

Figure 18:
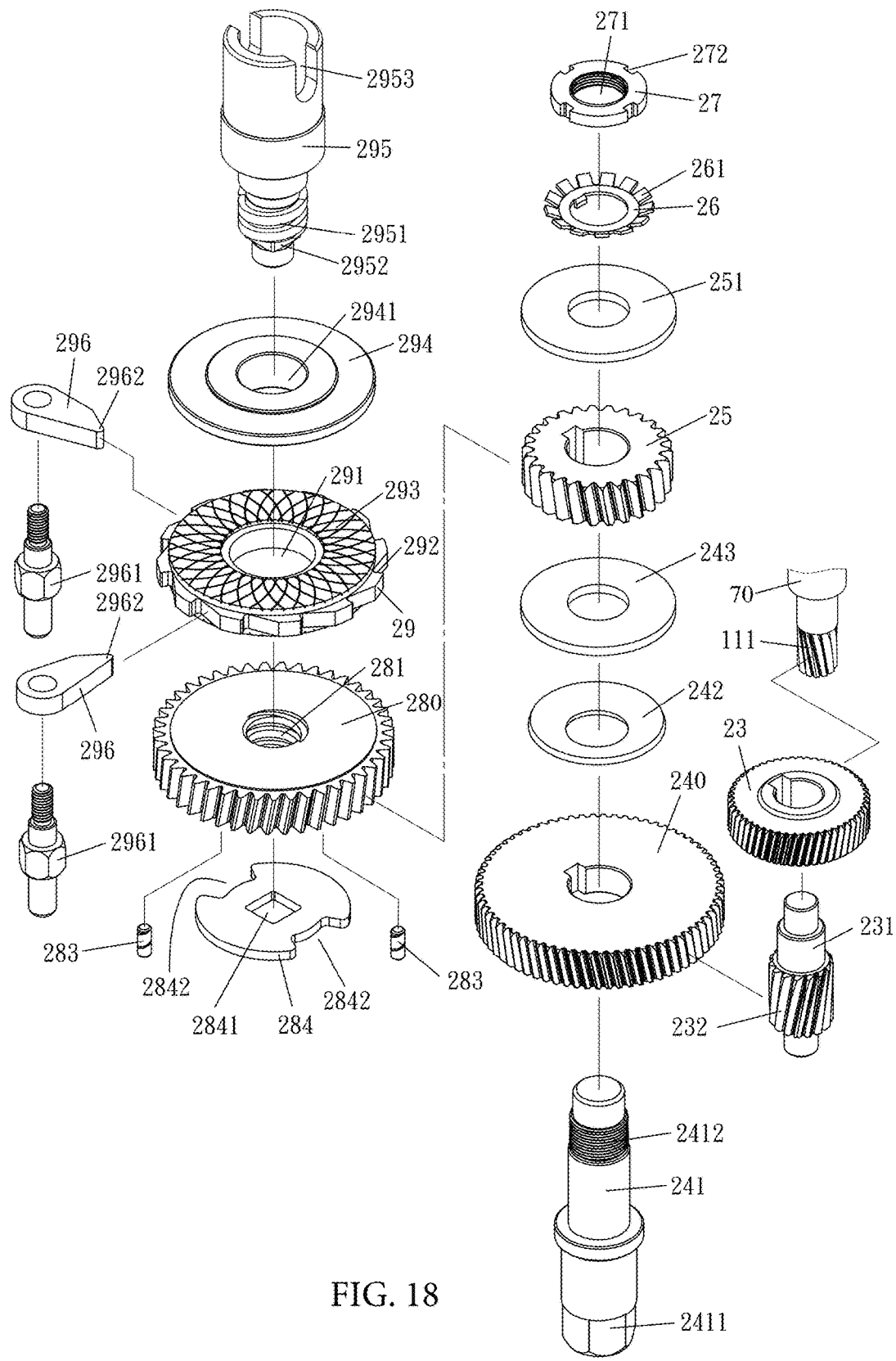
FIG. 18 is an exploded bottom view of a transmission structure of elements of the motor assembly of the large powered jack of the present invention.

In FIGS. 17 and 18, the slowing mechanism includes a first middle gear 23 engaged and transmitted by the first-section pinion 111 and having a spindle 231 may be coupled to a second-section pinion 232 and may be rotated synchronously with the first middle gear 23. One embodiment of the clutch device 66 is illustrated in FIG. 17 herein. A second middle gear 240 may be engaged and driven by the second-section pinion 232, and the spindle 241 of the second middle gear 240 may be formed into an angular tip 2411. The opposite end (or the lower end) of the spindle 241 may have a thread section 2412 with an opposite outer thread. After the spindle 241 is installed to the second middle gear 240, the spindle 241 may be passed through a concave arc elastic ring 242 and an upper lining 243, and then passed through a third middle gear 25, a lower lining 251 and an adjusting and a positioning ring 260, and finally screwed and coupled by a shaft hole 271 of a positioning screw ring 27 having an opposite inner thread than thread section 2412. The external periphery of the adjusting and positioning ring 260 may have a plurality of positioning plates 261 selectively deviated towards the positioning screw ring 27. The positioning screw ring 27 may have a plurality of symmetrical positioning recesses 272 formed on an external periphery 270 and may be configured to selectively deviate, abut and remain in the positioning screw ring 27.

Figure 19:
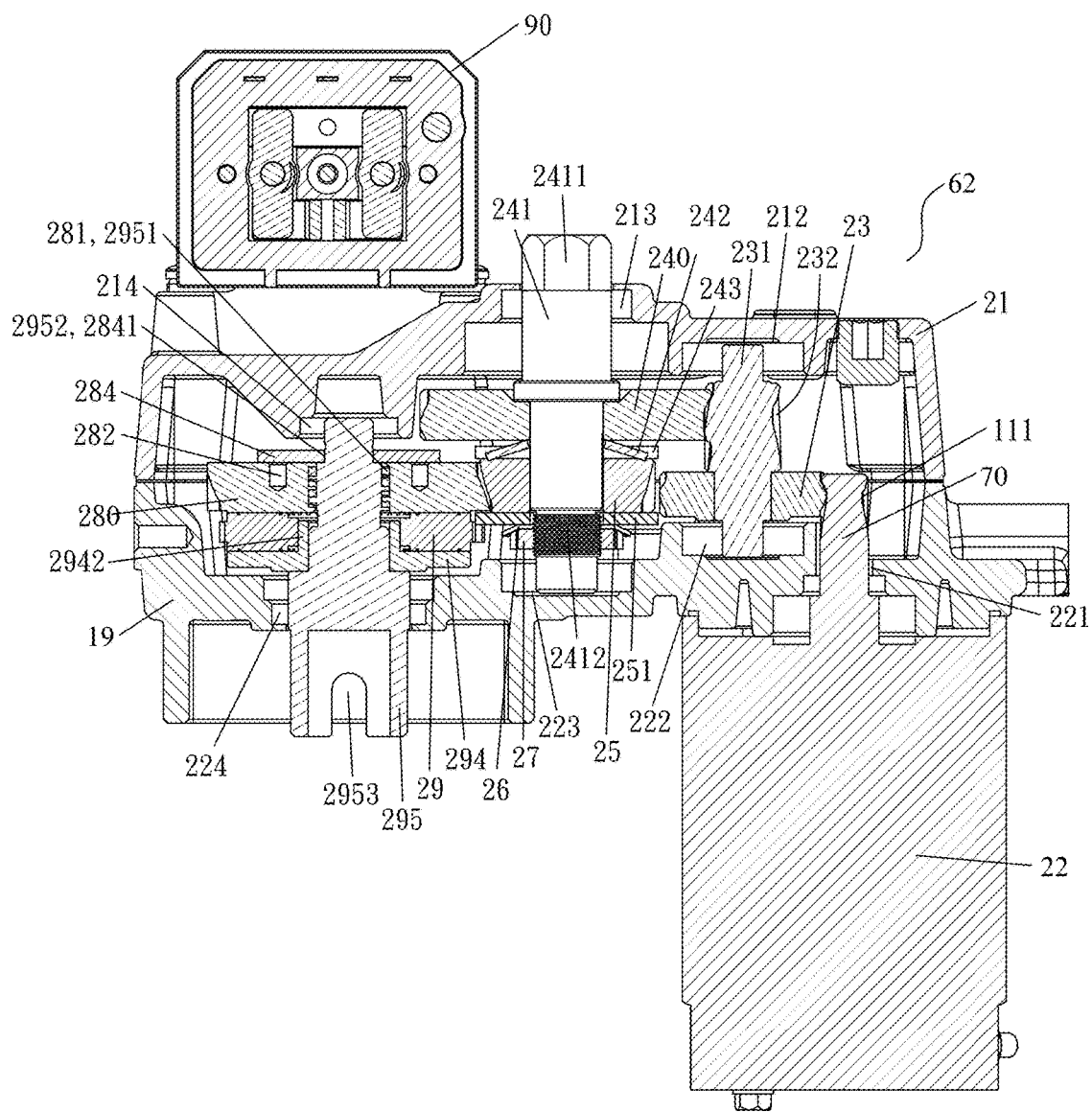
FIG. 19 is a cross sectional view of an assembly of an embodiment of the present invention.

In FIGS. 17 and 18, a power gear 280 is engaged and driven by the third middle gear 25, and has a shaft hole 281 with opposite inner thread formed at the center of the power gear 280, and a plurality of positioning plug holes 282 formed at an upper surface of the power gear 280 and arranged into a generally circular shape. One embodiment of brake mechanism 64 is illustrated by FIG. 17 herein. The plug holes 282 may be provided for selectively plugging at least one positioning plunger 283. A positioning plate 284 may be attached onto a top surface of the power gear 280 and has an angular perforation 2841 formed at the center of the positioning plate 284 and at least one arc groove 2842 formed at the periphery of the positioning plate 284. A brake disc 29 has a circular hole 291 formed at the center thereof, and a plurality of ratchet teeth 292 disposed at the periphery of the brake disc 29. The ratchet teeth 292 being arranged in the same direction. A lining 293 may be attached on both sides of the brake disc 29 for the braking purpose. A disc tray 294 may include a protruding base 2942 formed around the periphery of a through hole 2941 at the center of the disc tray 294. When the disc tray 294 is attached onto the bottom side of the brake disc 29, the protruding base 2942 may be pressed into the internal periphery of the circular hole 291 of the brake disc 29 (as shown in FIG. 19). An output shaft 295 may include an upper section comprised of a thread section 2951 with an opposite outer thread and an angular member 2952 provided for positioning, and a lower section which may include an engaged slot 2953 configured to be coupled to the elongated screw 28. The brake disc 29 may have at least one latching member 296 disposed on a side of the brake disc 29 for plugging and positioning a shaft 2961, and the shaft 2961 may be fixed between the upper and lower chasses 21, 19, so that the latching end 2962 of the latching member 296 may be aligned towards the ratchet 292, so that the brake disc 29 can be rotated in one direction only.

In FIG. 19, the upper chassis 21 and the lower chassis 19 are engaged and combined to form the chassis 200, the motor 22 is connected to the lower chassis 19, and the power shaft 70 is extended into the chassis 200 from the lower force-input perforation 221 of the lower chassis 19. The spindle 231 is accommodated between the first upper positioning cavity 212 and the first lower positioning cavity 222, and the first-section pinion 111 of the power shaft 70 is engaged with the first middle gear 23. The spindle 241 may be coupled to the second middle gear 240, the elastic ring 242, the upper lining 243, the third middle gear 25, the lower lining 251 and the adjusting and positioning ring 260. The thread section 2412 of the spindle 241 may then be screwed and coupled to the shaft hole 271 of the positioning screw ring 27. A lower end of the spindle 241 may be accommodated in to the second lower positioning cavity 223 of the lower chassis 19 and the angular tip 2411 at the top end may extend out of the upper middle through hole 213 of the upper chassis 21. Thus, a tool may be used to clamp the angular tip 2411 to rotate the spindle in order to lift or descend the tubes 14, 16 when there is a power disconnection or power failure. Now, the second middle gear 240 of the spindle 241 may be engaged with the second-section pinion 232 of the spindle 231, and the positioning plate 284, the power gear 280, the brake disc 29 and the disc tray 294 may be attached with each other sequentially. The protruding base 2942 of the disc tray 294 may be pressed into the circular hole 291 of the brake disc 29, and jointly contained between the upper and lower chasses 21, 19. The latching end 2962 of the latching member 296 may be pressed into the adjacent ratchet teeth 292, and then the output shaft 295 may be extended into the chassis 200 through the lower force-output perforation 224 of the lower chassis 19 and passed through the through hole 2941 of the protruding base 2942 of the disc tray 294. The thread section 2951 may be screwed and coupled to the shaft hole 281 of the power gear 280, and the angular member 2952 may enter into the angular perforation 2841 of the positioning plate 284 and may stay therein correspondingly. The power gear 280 may be engaged with the third middle gear 25 of the spindle 241. The controller 90 may be installed to the top of the upper chassis 21 and electrically coupled to the motor 22 for outputting a control signal via wired remote control, wireless remote control, or any other appropriate mechanism. After the control signal is received, determined, and computed by the controller 90, an instruction may be issued to the motor 22 to output power to drive the output shaft 295 to rotate in a forward or reverse direction. This may cause the nut 24 to rotate along the elongated screw 28 to translate the telescopic tubes 14, 16 to extend downwardly (to ascend) or retract upwardly (to descend).

In the assembling process of the high powered jack assembly 10 in a factory, the following may be selected and fixed. (1) the thread count and size between the positioning screw ring 27 and the thread section 2412, and (2) the thread count and size between the thread section 2951 and the shaft hole 281, wherein the selection of a coupling distance between the positioning screw ring 27 and the thread section 2412 may be based on the load capacity of the motor 22 to select a desirable or tolerable torque of the jack assembly 10. The thread count/coupling distance may be directly proportional to the desirable torque (but the tolerable torque may not be greater than the load capacity of the motor 22); and the selection of the coupling distance between the thread section 2951 and the shaft hole 281 may be adjusted to the brake sensitivity whenever the jack assembly 10 has no power. The coupling distance may be directly proportional to the brake sensitivity. For example, the tighter the coupling distance, the more the elastic ring 242 is compressed and the greater the normal force between the brake disc 29 and gear 280, the greater the torque before slipping.

After the positioning screw ring 27 is rotated and the coupling distance with the thread section 2412 is selected, the positioning plate 261 disposed on the adjusting and positioning ring 260 and adjacent to the positioning recess 272 may be bent towards the positioning recess 272. The positioning screw ring 27 may be abutted against at least one of the positioning recess 272 and cannot be moved so as to fix the positioning screw ring 27 and the thread section 2412 in the screwed condition. The elasticity of the adjusting and positioning ring 260 and the elastic ring 242 may force the second middle gear 240, the elastic ring 242, the upper lining 243, the third middle gear 25, the lower lining 251, the adjusting and positioning ring 260 and positioning screw ring 27 and the spindle 241 to be pushed and integrated into a synchronously rotating part.

As the motor 22 rotates to cause the load to lift, the second middle gear 240 may be driven and transmitted by the second-section pinion 232, and the third middle gear 25 may drive the power gear 280 and the output shaft 295 to rotate in a forward direction or a reverse direction in a normal operation as long as the torque falls within a tolerable range. If the torque produced by the weight of the load in an opposite direction is greater than the tolerable torque, the opposite torque drives the power gear 280 to rotate the third middle gear 25 powerfully in an opposite direction, so that operations with different directions or different speeds are produced between the third middle gear 25 and the second middle gear 240 to force the originally pushed and integrated part to be dissociated. This disconnects the power transmission between the third middle gear 25 and the second middle gear 240 and protects the motor 22 and generally prevents damage of the components during the transmission process.

After the coupling distance between the thread section 2951 and the shaft hole 281 is selected, the angular perforation 2841 of the positioning plate 284 may be sheathed on the angular member 2952 of the output shaft 295. The plunger 283 may then be plugged into an appropriate positioning plug hole 282. When a user operates the jack assembly 10 to output power to push and lift the load, the power gear 280 may actively drive the output shaft 295 to rotate. Since there is the arc groove 2842, the power gear 280 will be rotated in a very small angle first, and the connection between the thread section 2951 of the output shaft 295 and the shaft hole 281 becomes tighter. Thus the brake disc 29 and the disc tray 294 are forced to rotate synchronously. Here the rotating direction of the brake disc 29 is capable of driving the ratchet teeth 292 to push away the latching end 2962 of the latching member 296 to prevent the brake disc 29 from being latched. When the user operates the jack assembly 10 to output a power in an opposite direction to drive the load to descend slowly, the power gear 280 also actively drives and rotates the output shaft 295. Since there is the arc groove 2842, the power gear 280 will be rotated in a very small angle first. Therefore the thread section 2951 of the output shaft 295 and the shaft hole 281 may be separated slightly apart from each other, and the compressing effect among the brake disc 29, the power gear 280 and the disc tray 294 may be released. The rotating direction of the brake disc 29 may be restricted by the latching end 2962 of the latching member 296 of the ratchet teeth 292 and the brake disc 29 may be locked. The load may be driven by the power gear 280 and the output shaft 295 to descend slowly.

Regardless of lifting or descending the load, the power gear 280 may be stopped immediately, without lag, when the user stops the power output. The torque in an opposite direction produced by the weight of the load may instantly drive the output shaft 295 to rotate in an opposite direction. The coupling between the thread section 2951 of the output shaft 295 and the shaft hole 281 will become tighter, and the brake disc 29 and the disc tray 294 may be forced to compress each other. Here, the torque may be in an opposite direction to push the output shaft 295 to actively drive the power gear 280 to rotate in a direction such that the ratchet teeth 292 of the brake disc 29 may be latched by the latching end 2962 of the latching member 296. In the situation when the power gear 280 stops rotating and the brake disc 29 is latched, the mutually compressed disc tray 294 and output shaft 295 are also latched to produce a brake effect without any buffering time. This is to help assure proper operation of the jack assembly 10. After the brake, the jack assembly 10 may be operated to ascend or descend normally by the power as long as the power gear 280 is driven by the third middle gear 25 again. The braking effect can be released whenever power is transmitted, and the normal ascending or descending operation may be resumed.

From the description above, the jack assembly 10 may include a torque limiting mechanism comprised of the spindle 241, the second middle gear 240, the elastic ring 242, the upper lining 243, the third middle gear 25, the lower lining 251, the adjusting and positioning ring 260 and the positioning screw ring 27. The torque limiting mechanism may be capable of producing a torque limitation effect. The jack assembly 10 may include a powerless brake mechanism comprised of the positioning plate 284, the power gear 280, the brake disc 29, the disc tray 294, the output shaft 295 and the latching member 296. It may be capable of producing a ratcheted braking effect. The torque limiting mechanism and brake mechanism as described may be advantageously employed by the combination with a single elongated screw 28 and translating nut 24 such as the recirculating ball nut assembly 52 illustrated by FIG. 11.

The jack assembly 10 may also include the following advantages and effects: 1. The jack assembly 10 may include a torque limiting mechanism comprised of the spindle 241, the second middle gear 240, the elastic ring 242, the upper lining 243, the third middle gear 25, the lower lining 251, and the adjusting and positioning ring 260 and positioning screw ring 27. It may be provided for setting a torque limit that is smaller than the load capacity of the motor 22, so that the transmission of power can be stopped immediately when the torque limit is reached. The utility of the power source generally always remains below its load capacity to attempt to prevent damage caused by over-current. 2. The jack assembly 10 may include a powerless brake mechanism comprised of the positioning plate 284, the power gear 280, the brake disc 29, the disc tray 294, the output shaft 295 and the latching member 296. It may be provided for achieving the effects of stopping and braking the electric jack immediately and facilitating users to operate the jack to lift a load to a specific height and stop the operation immediately when a desired height is reached. 3. The jack assembly 10 may be operated manually by clamping the angular tip 2411 exposed from the upper end of the spindle 241 and rotating the spindle 241 by a tool to ascend or descend a load, even if the battery is exhausted or the voltage is insufficient to start the power. In the manual operation, the effects of torque limitation and immediate braking are also offered. In summation of the description above, the jack assembly 10 includes torque limitation effect and ratcheted braking effect. These components are compatibly installed in a reduction gear of a machinery part of the jack assembly 10 to maximize their effects and achieve the expected purposes.

Figure 20:
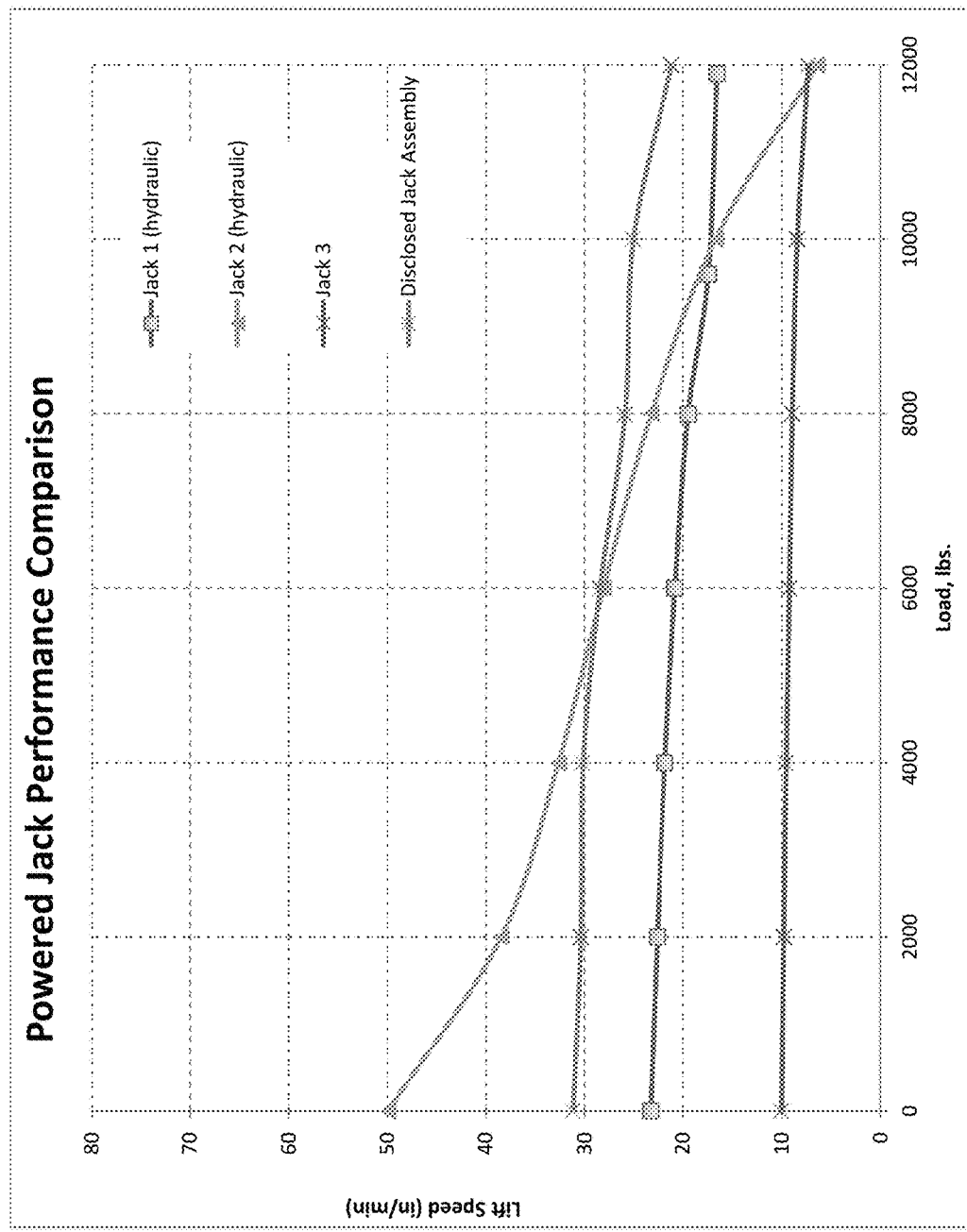
FIG. 20 is a comparison chart illustrating the lift speed performance of the jack assembly of the instant disclosure against Jack 1 (hydraulic), Jack 2 (hydraulic), and Jack 3.
Figure 21:
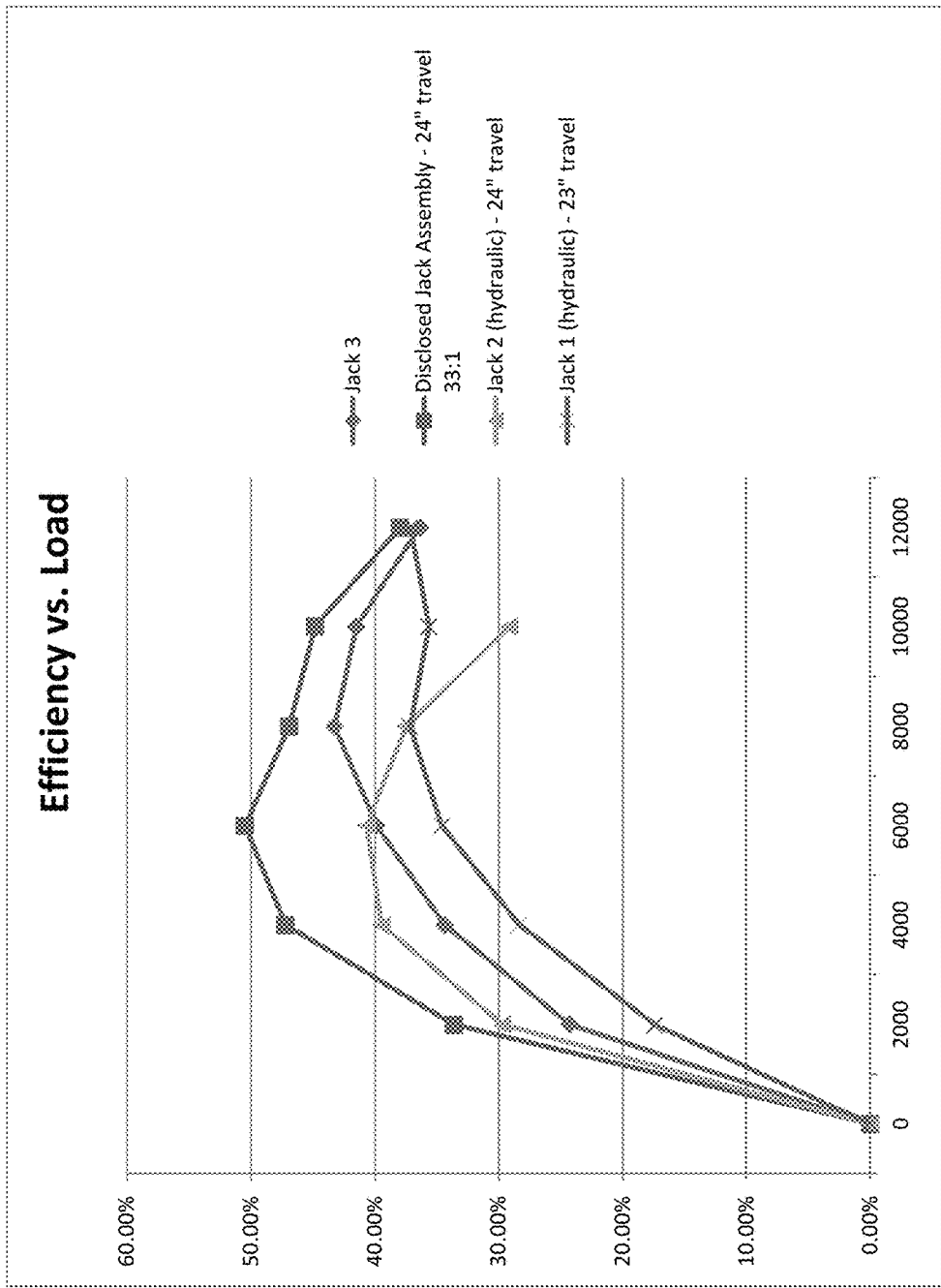
FIG. 21 is a comparison chart illustrating the efficiency vs. load performance of the jack assembly of the instant disclosure against Jack 1 (hydraulic), Jack 2 (hydraulic), and Jack 3.
Figure 22:
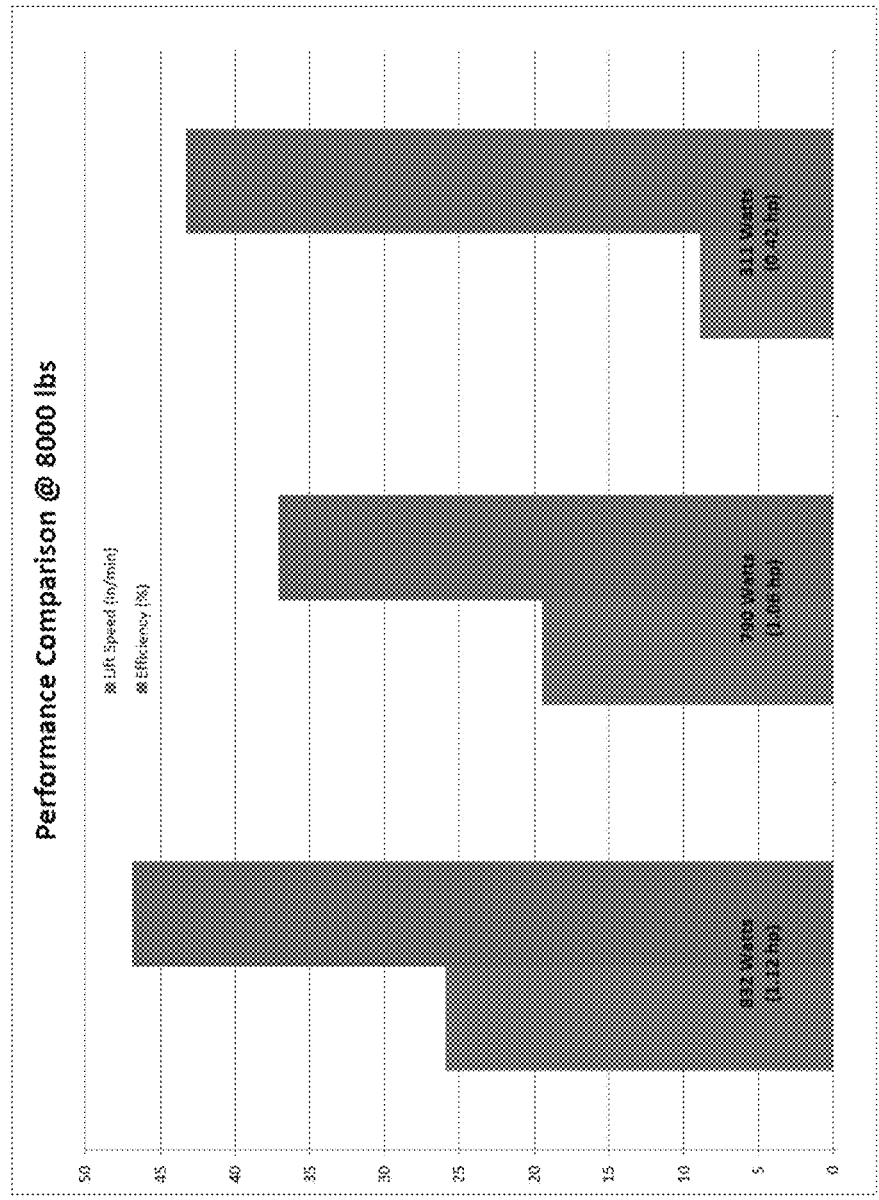
FIG. 22 is a comparison chart illustrating the lift speed and efficiency performance of the jack assembly of the instant disclosure against Jack 1 (hydraulic), and Jack 3 while translating a load of 8000 lbs.

FIGS. 20, 21, and 22 illustrate comparison charts identifying the improvement of performance of the described jack assembly 10. In particular, FIG. 20 illustrates the improvement to the speed in which the described jack assembly 10 ("Disclosed Jack") may display improved lift speed over existing electrical jacks such as "Jack 1 (Hydraulic)", the "Jack 2 (hydraulic)" and "Jack 3." Jacks 1 and 2 are powered jack assemblies that include a hydraulic lift system while Jack 3 is a powered jack assembly without a hydraulic system. The jack assemblies may be considered "high powered" because they are configured to support and translate loads that exceed at least 6,000 lbs. but generally over 8,000 lbs. at a high rate of speed. In particular, the jack assembly 10 displays improved lift speeds for loads that exceed 8,000 lbs. over the existing high powered jacks at a rate of speed that exceeds 10 inches per minute. Further, the jack assembly 10 may have a rate of speed that exceeds 15 inches per minute for loads that exceed 8,000 lbs. and may even perform at a rate of speed that exceeds 20 inches per minute at loads that exceed 8,000 lbs as identified by FIG. 20. This performance improvement may be due, in part, to the single elongated screw and recirculating ball nut assembly (rolling friction) being translated by the gear assembly 62 that is configured as described above. The jack assembly 10 is more efficient than Jack's 1, 2, and 3 as a higher percentage of motor output goes to the task of lifting the load. Jacks 1, 2, and 3 include additional iterations of energy transformation such as the conversion from electrical energy to hydraulic energy and then to mechanical energy of Jacks 1 and 2 and the timed rotation of multiple elongated screws of Jack 3.

Further, FIG. 21 illustrates the improvement of efficiency versus load in which the described jack assembly 10 ("Disclosed Jack") may display improved efficiency over existing powered jacks such as "Jack 1 (Hydraulic)", the "Jack 2 (hydraulic)" and "Jack 3." The jack assembly 10 displays improved efficiency for all loads between about 2,000 lbs. through at least 12,000 lbs. over the existing jacks. FIG. 22 illustrates the performance comparison between the jack assembly 10 as it is tested against Jack 1 (hydraulic) and Jack 3. This chart illustrates that the instant jack assembly 10 has a high lift speed and efficiency while translating a load of 8,000 lbs. The jack assembly 10 displays an energy usage of 832 watts or 1.12 horsepower while Jack 1 (hydraulic) displayed energy usage of 790 watts or 1.06 horse power while Jack 3 displayed energy usage of 311 watts or 0.42 horsepower. Notably, Jack 3 includes a pair of elongated screws and displays static friction loss and inherent efficiency loss as it requires timed rotational accuracy of the screws and displays increased friction due to surface contact area. The jack assembly 10 may display an input power energy usage of about 0.9 horse power or about 670 watts while translating loads in excess of 8,000 lbs at a rate of speed over about 10 inches per minute.

This difference in performance may be due, in part, to the single elongated screw 28 and recirculating ball nut assembly 24 (rolling friction) being translated by the gear assembly 62 that is configured as described above. The jack assembly 10 may operate directly from line or battery power to mechanical lift power while bypassing conversion to hydraulic power. The jack assembly 10 improves power efficiency and translation speeds while utilizing electrical to mechanical power conversion principles without hydraulic or any other mechanisms.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A jack assembly for a towed vehicle, the jack assembly comprising:
   an outer tube;
   an inner tube telescopingly engaged with the outer tube, the inner tube engaged with a nut therein;
   a non-hydraulic motor assembly;
   at least one elongated screw in rotatable communication with the non-hydraulic motor assembly and the nut; and
   a dust tube that surrounds the elongated screw and is positioned within the outer tube and the inner tube to reduce exposure of debris against the elongated screw;
   wherein operation of the non-hydraulic motor assembly rotates the elongated screw causing the nut to translate along the elongated screw and causing the inner tube to translate relative to the outer tube such that the outer and inner tubes support loads in excess of 8,000 pounds at a rate of speed that exceeds about 10 inches per minute.

2. The jack assembly of claim 1, wherein the non-hydraulic motor assembly includes a rotor configured to rotate about a first axis within a housing.

3. The jack assembly of claim 1, wherein the elongated screw is configured to rotate about a second axis within the outer and inner tubes.

4. The jack assembly of claim 1, further comprising an attachment assembly connected to the outer tube that is configured to attach the jack assembly to a vehicle.

5. The jack assembly of claim 1, further comprising a base attached to the inner tube.

6. The jack assembly of claim 5, wherein the motor assembly is attached to the outer tube and is located opposite from the base.

7. The jack assembly of claim 1, wherein the nut comprises a recirculating ball nut assembly having housing with at least one track and a plurality of ball bearings, the elongated screw includes a plurality of threads wherein the track and threads are configured to receive the plurality of ball bearings therein such that as the elongated screw rotates, the plurality of ball bearings move through the threads and track and the housing translates along the elongated screw.

8. The jack assembly of claim 1, wherein the dust tube creates a labyrinth seal by providing a tortuous path that reduces exposure of debris against the elongated screw.

9. A jack assembly for a towed vehicle, the jack assembly comprising:
an outer tube;
an inner tube operatively engaged with the outer tube; and
a telescoping mechanism operatively coupled with the outer and inner tubes, wherein the telescoping mechanism telescopingly positions the outer tube relative to the inner tube, the telescoping mechanism comprises:
an elongated screw;
a dust tube that surrounds the elongated screw and is positioned within the outer tube and the inner tube to reduce exposure of debris against the elongated screw; and
a recirculating ball nut assembly configured to translate along the elongated screw such that the outer and inner tubes are configured to be electronically controlled to telescope relative to one another between a retracted position and an extended portion,
wherein the outer and inner tubes support a load in excess of 8,000 pounds at a rate of speed that exceeds about 10 inches per minute.

10. The jack assembly of claim 9, wherein the recirculating ball nut assembly includes a housing with at least one track and a plurality of ball bearings, the elongated screw includes a plurality of threads wherein the track and threads are configured to receive the plurality of ball bearings therein such that as the elongated screw rotates, the plurality of ball bearings move through the threads and track and the housing translates along the elongated screw.

11. The jack assembly of claim 9, further comprising a motor assembly including a rotor configured to rotate about a first axis within a housing.

12. The jack assembly of claim 11, wherein the elongated screw is configured to rotate about a second axis within the outer and inner tubes such that the first axis is generally parallel to the second axis.

13. The jack assembly of claim 9, further comprising an attachment assembly connected to a side portion of the outer tube that is configured to attach the jack assembly to a vehicle.

14. The jack assembly of claim 9, further comprising a base attached to the inner tube.

15. The jack assembly of claim 14, wherein the motor assembly is attached to the outer tube and is located opposite from the base.

16. The jack assembly of claim 9, wherein the telescoping mechanism includes a motor having a horsepower rating of over 0.9 horsepower.

17. The jack assembly of claim 9, wherein the telescoping mechanism includes a motor that displays an energy usage of over 670 watts.

18. The jack assembly of claim 17, wherein the telescoping mechanism includes a motor having a horsepower rating of at least 1.12 horsepower and an energy usage rating of at least 832 watts.

19. The jack assembly of claim 9, wherein the telescoping mechanism includes a motor that displays an energy usage of over 500 watts.

20. The jack assembly of claim 9 wherein the telescoping mechanism includes a single form of energy conversion from electrical to mechanical.

21. The jack assembly of claim 9 further comprising a self leveling foot.

22. The jack assembly of claim 9, wherein the dust tube creates a labyrinth seal by providing a tortuous path that reduces exposure of debris against the elongated screw.

23. A single energy conversion high powered jack assembly for a towed vehicle, the jack assembly comprising:
an outer tube;
an inner tube operatively engaged with the outer tube;
a self leveling foot; and
a non-hydraulic telescoping mechanism operatively coupled with the outer and inner tubes, wherein the non-hydraulic telescoping mechanism telescopingly positions the outer tube relative to the inner tube, the non-hydraulic telescoping mechanism comprises:
an elongated screw;
a dust tube that surrounds the elongated screw and is positioned within the outer tube and the inner tube to reduce exposure of debris against the elongated screw; and
a recirculating ball nut assembly configured to translate along the elongated screw such that the outer and inner tubes are configured to be electronically controlled to telescope relative to one another between a retracted position and an extended portion, whereby the outer and inner tubes support a load that exceeds 8,000 pounds and telescope at a rate of speed that exceeds about 10 inches per minute under at least the 8,000 pound load.

24. The jack assembly of claim 23, wherein the dust tube creates a labyrinth seal by providing a tortuous path that reduces exposure of debris against the elongated screw.

* * * * *